United States Patent
Lee et al.

(10) Patent No.: US 11,700,601 B2
(45) Date of Patent: Jul. 11, 2023

(54) METHOD BY WHICH USER EQUIPMENT CONTROLS TRANSMISSION POWER OF SIDELINK SIGNAL IN WIRELESS COMMUNICATION SYSTEM AND APPARATUS THEREFOR

(71) Applicant: LG ELECTRONICS INC., Seoul (KR)

(72) Inventors: Seungmin Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/262,587

(22) PCT Filed: Aug. 8, 2019

(86) PCT No.: PCT/KR2019/010027
§ 371 (c)(1),
(2) Date: Jan. 22, 2021

(87) PCT Pub. No.: WO2020/032657
PCT Pub. Date: Feb. 13, 2020

(65) Prior Publication Data
US 2021/0282143 A1   Sep. 9, 2021

Related U.S. Application Data

(60) Provisional application No. 62/716,299, filed on Aug. 8, 2018.

(51) Int. Cl.
*H04B 7/0426* (2017.01)
*H04W 72/044* (2023.01)
(Continued)

(52) U.S. Cl.
CPC ...... *H04W 72/0473* (2013.01); *H04B 7/0426* (2013.01); *H04W 52/34* (2013.01); *H04W 52/42* (2013.01); *H04W 76/14* (2018.02)

(58) Field of Classification Search
CPC . H04W 72/0473; H04W 52/34; H04W 52/42; H04W 76/14; H04W 52/48; H04B 7/0426
See application file for complete search history.

(56) References Cited

U.S. PATENT DOCUMENTS

| 5,528,623 A * | 6/1996 | Foster, Jr. ............ H04B 1/7156 455/462 |
| 2003/0073463 A1* | 4/2003 | Shapira .................... H04B 1/40 455/562.1 |

(Continued)

FOREIGN PATENT DOCUMENTS

KR     1020170044657 A     4/2017

OTHER PUBLICATIONS

Nadia Brahmi et al., Fifth Generation Communication Automotive Research and Innovation, Deliverable D3.1, "Intermediate 5G V2X Radio", Version: v1.0, May 31, 2018.

*Primary Examiner* — Christine Ng
(74) *Attorney, Agent, or Firm* — Dentons US LLP

(57) ABSTRACT

Disclosed are a method and an apparatus by which user equipment controls transmission power of a sidelink signal in a wireless communication system that supports a sidelink, according to various embodiments. Disclosed are a method and an apparatus by which user equipment controls transmission power of a sidelink signal in a wireless communication system that supports a sidelink, wherein the method comprises the steps of: calculating required power for each antenna unit included in a plurality of antenna units to which the sidelink signal is transmitted; determining reference transmission power on the basis of the required power calculated for the plurality of antenna units; and allocating transmission power for the plurality of antenna units on the basis of the reference transmission power.

15 Claims, 24 Drawing Sheets

(51) Int. Cl.
*H04W 76/14* (2018.01)
*H04W 52/34* (2009.01)
*H04W 52/42* (2009.01)

(56) References Cited

U.S. PATENT DOCUMENTS

| | | | | |
|---|---|---|---|---|
| 2003/0118082 | A1* | 6/2003 | Ozluturk | H04W 52/322 |
| | | | | 375/130 |
| 2008/0188265 | A1* | 8/2008 | Carter | H04W 52/24 |
| | | | | 375/E1.02 |
| 2010/0272211 | A1 | 10/2010 | Ohwatari et al. | |
| 2011/0223870 | A1* | 9/2011 | Tujkovic | H04B 7/0691 |
| | | | | 455/73 |
| 2015/0382204 | A1* | 12/2015 | Bassiri | H04W 16/20 |
| | | | | 455/456.1 |
| 2016/0242060 | A1* | 8/2016 | Kakishima | H04W 16/28 |
| 2017/0183007 | A1* | 6/2017 | Oh | B60W 30/09 |
| 2017/0201954 | A1 | 7/2017 | Xiao | |
| 2018/0041969 | A1 | 2/2018 | Kwak et al. | |
| 2018/0152325 | A1* | 5/2018 | Frank | H04B 7/0413 |
| 2019/0208476 | A1* | 7/2019 | Wu | H04W 52/247 |
| 2019/0274150 | A1* | 9/2019 | Huang | H04W 28/24 |
| 2019/0296877 | A1* | 9/2019 | Zhang | H04L 1/0009 |
| 2020/0314803 | A1* | 10/2020 | Zhang | H04W 74/006 |
| 2021/0289507 | A1* | 9/2021 | Wang | H04W 28/0268 |

\* cited by examiner

FIG. 5
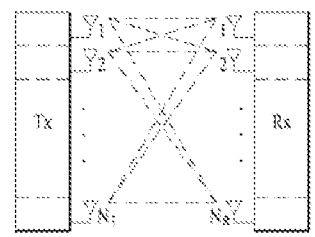
(a)
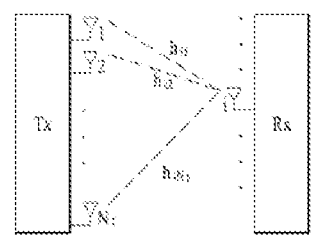
(b)

FIG. 9
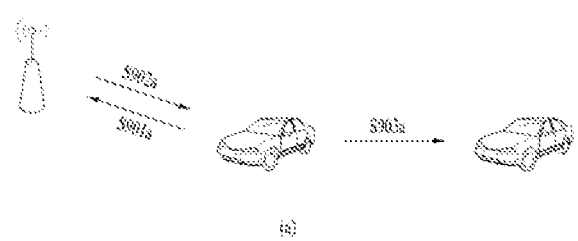
(a)
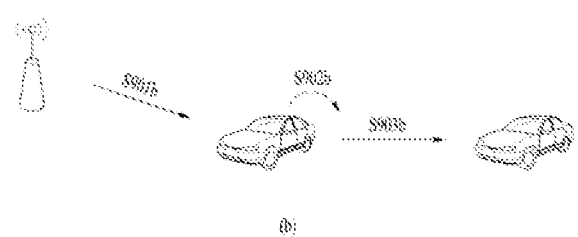
(b)

FIG. 18

| Frequency Range | scenario | Type 1 Delay (ns) | Type 2 Delay (ns) |
|---|---|---|---|
| 1 | 1 | 600 | 2000 |
|   | 2 | 600 | 2000 |
|   | 3 | 600 | 2000 |
|   | 4 | 400 | 950 |
| 2 | 1 | 600 | 2000 |
|   | 2 | 600 | 2000 |
|   | 3 | 600 | 2000 |
|   | 4 | 400 | 950 |

METHOD BY WHICH USER EQUIPMENT CONTROLS TRANSMISSION POWER OF SIDELINK SIGNAL IN WIRELESS COMMUNICATION SYSTEM AND APPARATUS THEREFOR

This application is the National Stage filing under 35 U.S.C. 371 of International Application No. PCT/KR2019/010027, filed on Aug. 8, 2019, which claims the benefit of U.S. Provisional Application No. 62/716,299, filed on Aug. 8, 2018, the contents of which are all hereby incorporated by reference herein in their entirety.

TECHNICAL FIELD

The present disclosure relates to a wireless communication system, and more particularly, to a method and apparatus for controlling the transmission power of a sidelink signal by a user equipment (UE) in a wireless communication system.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

An aspect of the present disclosure is to provide a method of allocating transmission power to each individual antenna unit by determining reference transmission power based on required power calculated for each of a plurality of distributed antenna units and thus reflecting actual transmission power required for the antenna units as much as possible, when a sidelink signal is transmitted through the plurality of antenna units.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of controlling transmission power of a sidelink signal by a user equipment (UE) in a wireless communication system includes calculating required power for each of a plurality of antenna units through which the sidelink signal is transmitted, determining reference transmission power based on the required power calculated for the plurality of antenna units, and allocating transmission power to the plurality of antenna units based on the reference transmission power.

Alternatively, the transmission power allocated to each of the plurality of antenna units may be equal.

Alternatively, the predetermined threshold may be configured differently according to information related to the priority of a sidelink signal corresponding to each antenna unit.

Alternatively, when a change ratio between the required power of each antenna unit and the transmission power allocated to the antenna unit exceeds a predetermined ratio, the reference transmission power may be adjusted to decrease the change ratio to or below the predetermined ratio.

Alternatively, the reference transmission power may be determined to be the average of the required power.

Alternatively, the average of the required power may be calculated by applying a weight to the required power of each antenna unit, and the weight may be set on an antenna unit basis based on information related to the priority of a sidelink signal corresponding to each antenna unit.

Alternatively, the average of the required power may be calculated by applying a weight to the required power of each antenna unit, and a weight may be set on an antenna unit basis based on a channel busy rate (CBR) or channel occupancy rate (CR) measured for each antenna unit.

Alternatively, the reference transmission power may be determined to be the required power of one of the plurality of antenna units based on a retransmission number of a sidelink signal corresponding to each antenna unit.

Alternatively, the reference transmission power may be determined to be the required power of one of the plurality of antenna units based on the priority and reliability of traffic of a sidelink signal corresponding to each antenna unit.

Alternatively, the reference transmission power may be determined to be the required power of one of the plurality of antenna units based on the magnitude of the required power calculated for each antenna unit.

Alternatively, when CRB measurement and congestion control is performed on an antenna unit basis, maximum allowed transmission power may be configured independently for each of the plurality of antenna units.

Alternatively, the maximum allowed transmission power may be configured based on a combination of the priority of traffic of a sidelink signal corresponding to each antenna unit and a CRB measurement of the antenna unit.

Alternatively, when the maximum allowed transmission power is less than the reference transmission power, the reference transmission power may be adjusted.

Alternatively, the plurality of antenna units may be physically distributed to achieve diversity of transmission and reception directions.

Alternatively, each of the plurality of antenna units may correspond to any one of an antenna panel, an antenna port, a transceiver unit (TXRU), and an antenna element.

In another aspect of the present disclosure, an apparatus for controlling transmission power of a sidelink signal in a wireless communication system supporting sidelink includes a memory storing a program, and a processor configured to control the transmission power of the sidelink signal based on the program stored in the memory. The processor is configured to calculate required power for each of a plurality of antenna units through which the sidelink signal is transmitted, determine reference transmission power based on the required power calculated for the plurality of antenna units, and allocate transmission power to the plurality of antenna units based on the reference transmission power, based on the program stored in the memory.

Alternatively, the processor may be configured to receive a user input, and switch an operation mode of a vehicle related to the apparatus from an autonomous driving mode to a manual driving mode or from the manual driving mode to the autonomous driving mode based on the received user input.

Advantageous Effects

According to various embodiments of the present disclosure, when a sidelink signal is transmitted through a plurality of distributed antenna units, transmission power may be allocated to each individual antenna unit by determining reference transmission power based on required power calculated for each of the antenna units and thus reflecting actual transmission power required for the antenna units as much as possible.

It will be appreciated by persons skilled in the art that the effects that may be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 5 is a diagram illustrating the configuration of a wireless communication system having multiple antennas;

FIG. 9 is a diagram referred to for describing transmission modes and scheduling schemes for vehicle-to-everything (V2X);

FIGS. 17 and 18 are diagrams illustrating an operation related to bandwidth part (BWP) switching delay;

BEST MODE

Figure 1:
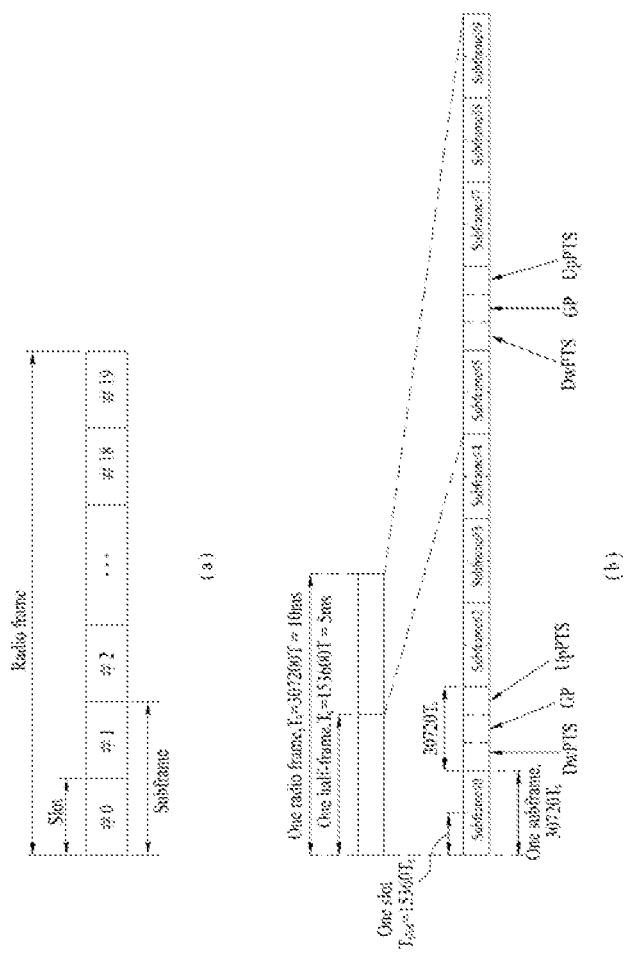
FIG. 1 is a diagram illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure may be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure may be supported by those documents. Further, all terms as set forth herein may be explained by the standard documents.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink (DL) and SC-FDMA for uplink (UL). LTE-A is an evolution of 3GPP LTE. WiMAX may be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency-division multiplexing (OFDM) wireless packet communication system, UL and/or DL data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A DL radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for DL, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of UL transmission synchronization to a UE at an eNB. The GP is a period between a UL and a DL, which eliminates UL interference caused by multipath delay of a DL signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
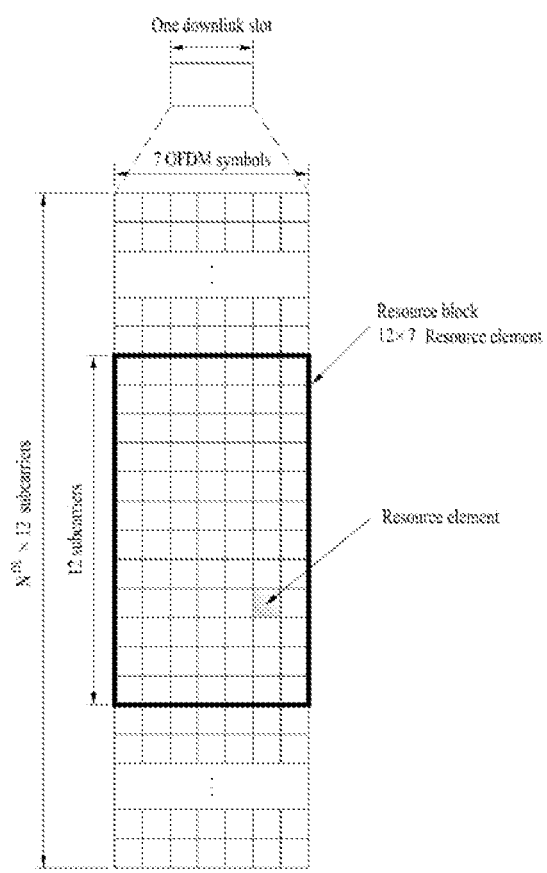
FIG. 2 is a diagram illustrating a resource grid during the duration of one downlink slot.

FIG. 2 illustrates the structure of a DL resource grid for the duration of one DL slot. A DL slot includes 7 OFDM symbols in the time domain and an RB includes 12 subcarriers in the frequency domain, which does not limit the scope and spirit of the present disclosure. For example, a DL slot may include 7 OFDM symbols in the case of the normal CP, whereas a DL slot may include 6 OFDM symbols in the case of the extended CP. Each element of the resource grid is referred to as a resource element (RE). An RB includes 12×7

REs. The number of RBs in a DL slot, NDL depends on a DL transmission bandwidth. A UL slot may have the same structure as a DL slot.

Figure 3:
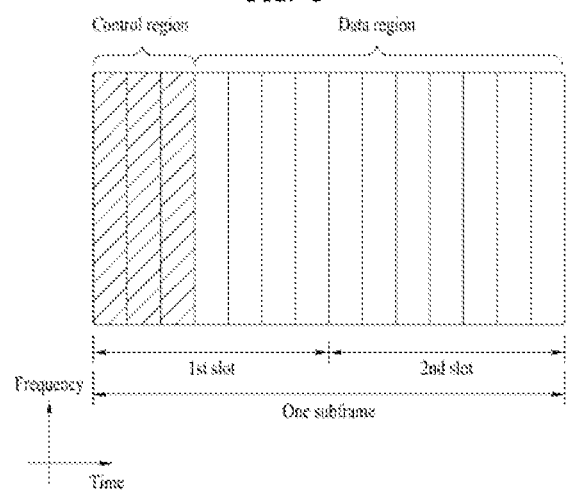
FIG. 3 is a diagram illustrating the structure of a downlink subframe.

FIG. 3 illustrates the structure of a DL subframe. Up to three OFDM symbols at the start of the first slot in a DL subframe are used for a control region to which control channels are allocated and the other OFDM symbols of the DL subframe are used for a data region to which a PDSCH is allocated. DL control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to a UL transmission. Control information carried on the PDCCH is called downlink control information (DCI). The DCI transports UL or DL scheduling information, or UL transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
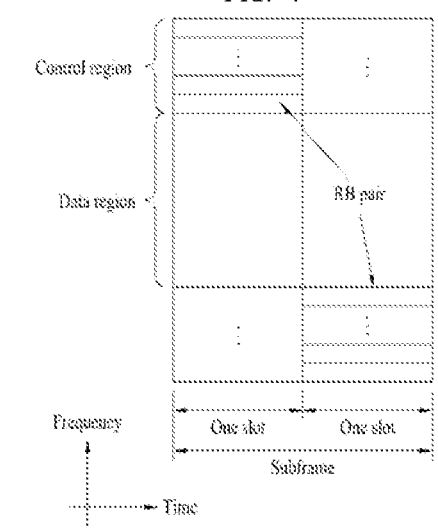
FIG. 4 is a diagram illustrating the structure of an uplink subframe.

FIG. 4 illustrates the structure of a UL subframe. A UL subframe may be divided into a control region and a data region in the frequency domain. A physical uplink control channel (PUCCH) carrying uplink control information (UCI) is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into DL RSs and UL RSs. In the current LTE system, the UL RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of a UL channel in a different frequency.

The DL RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when DL DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires DL channel information, the former should be transmitted in a broad band and received even by a UE that does not receive DL data in a specific subframe. This RS is also used in a situation like handover. The latter is an RS that an eNB transmits along with DL data in specific resources. A UE may demodulate the data by measuring a channel using the RS. This RS should be transmitted in a data transmission area.

Modeling of Multiple-Input Multiple-Output (MIMO) System

FIG. 5 is a diagram illustrating a configuration of a wireless communication system having multiple antennas.

As illustrated in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \qquad \text{[Equation 1]}$$

For instance, in an MIMO communication system, which uses four Tx antennas and four Rx antennas, a transmission rate four times higher than that of a single antenna system may be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling may be represented as follows. It is assumed that there are $N_T$ Tx antennas and $N_R$ Rx antennas.

Regarding a transmitted signal, if there are $N_T$ Tx antennas, the maximum number of pieces of information that may be transmitted is $N_T$. Hence, the transmission information may be represented as shown in Equation 2.

$$s = [s_1, s_2, \ldots, s_{N_T}]^T \quad \text{[Equation 2]}$$

Meanwhile, transmit powers may be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers may be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$, may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas may be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i may be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas may be expressed as follows.

$$n = [n_1, n_2, \ldots, n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix may also be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix may be the maximum number of channels through which different pieces of information may be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
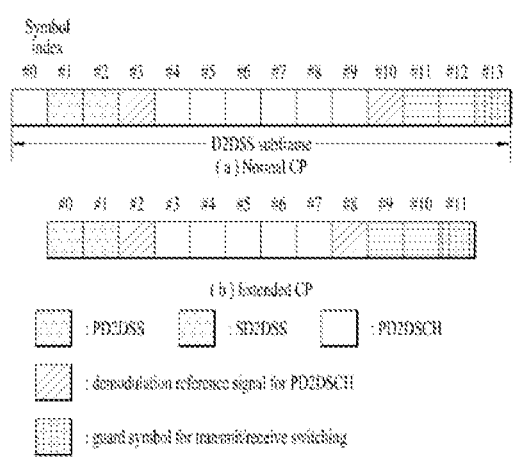
FIG. 6 is a diagram illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-Chu sequence of a predetermined length or a primary synchronization signal (PSS). Unlike a DL primary synchronization signal (PSS), the PD2DSS may use a different Zadoff-Chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike the DL PSS/SSS (secondary synchronization signal), the PD2DSS/SD2DSS follows a UL subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS may be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
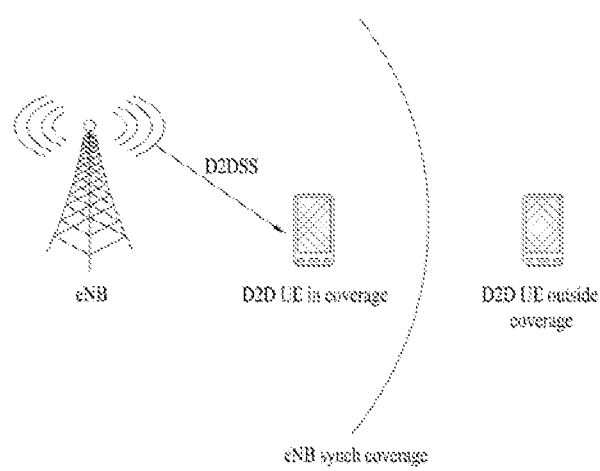
FIG. 7 is a diagram illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

Figure 8:
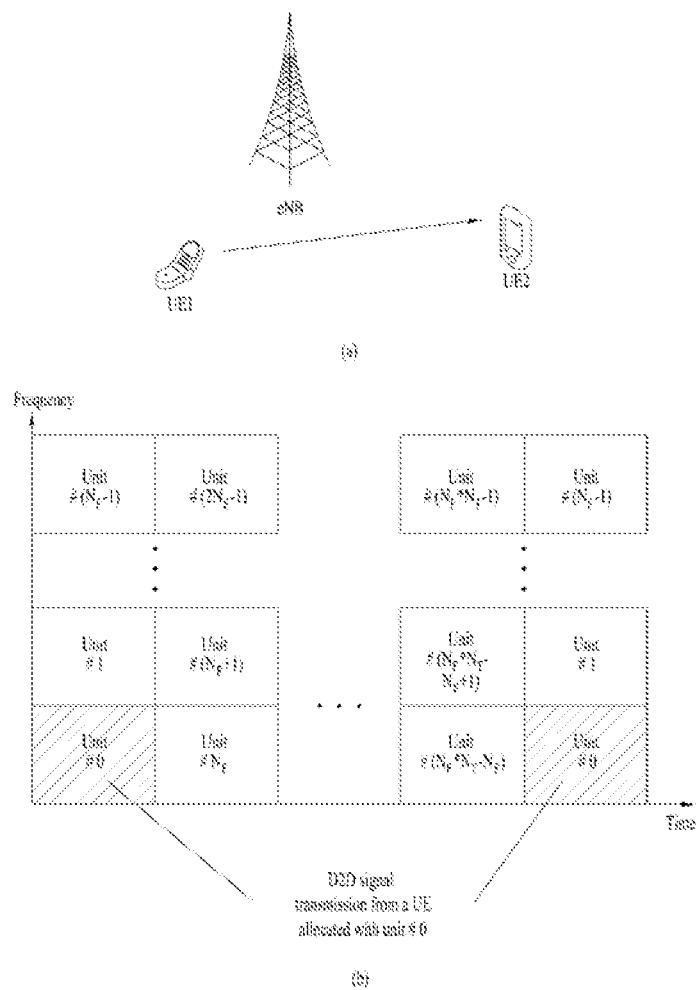
FIG. 8 is a diagram illustrating an exemplary D2D resource pool for D2D communication.

FIG. 8 shows an example of a first UE (UE1), a second UE (UE2) and a resource pool used by UE1 and UE2 performing D2D communication. In FIG. 8(a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB may inform UE1 of the resource pool. If UE1 is located at the outside of coverage of the eNB, the resource pool may be informed by a different UE or may be determined by a predetermined resource. In general, a resource pool includes a plurality of resource units. A UE selects one or more resource units from among a plurality of the resource units and may be able to use the selected resource unit(s) for D2D signal transmission. FIG. 8(b) shows an example of configuring a resource unit. Referring to FIG. 8(b), the entire frequency resources are divided into the $N_F$ number of resource units and the entire time resources are divided into the $N_T$ number of resource units. In particular, it is able to define $N_F*N_T$ number of resource units in total. In particular, a resource pool may be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool may be classified into various types. First of all, the resource pool may be classified according to contents of a D2D signal transmitted via each resource pool. For example, the contents of the D2D signal may be classified into various signals and a separate resource pool may be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with D2D data. In this case, an SA resource pool may correspond to a pool of resources that an SA and D2D data are transmitted in a manner of being multiplexed. The SA signal may also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information may be transmitted only in a resource pool for the D2D data channel. In other word, REs, which are used to transmit SA information in a specific resource unit of an SA resource pool, may also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
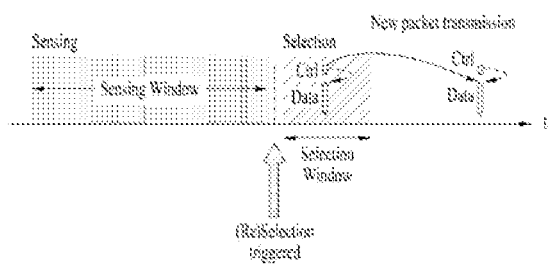
FIG. 10 is a diagram illustrating a method of selecting resources in V2X.
Figure 11:
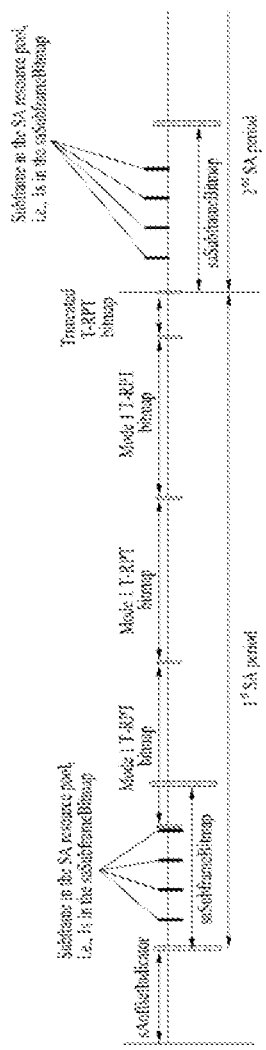
FIG. 11 is a diagram referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901*a*), the eNB allocates the resources (S902*a*), and the vehicle transmits a signal in the resources to another vehicle (S903*a*). In the centralized transmission scheme, resources of another carrier may be also scheduled. In distributed scheduling corresponding to transmission mode 4 illustrated in FIG. 9(*b*), a vehicle selects transmission resources (S902*b*), while sensing resources preconfigured by the eNB, that is, a resource pool (S901*b*), and then transmits a signal in the selected resources to another vehicle (S903*b*). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Figure 12:
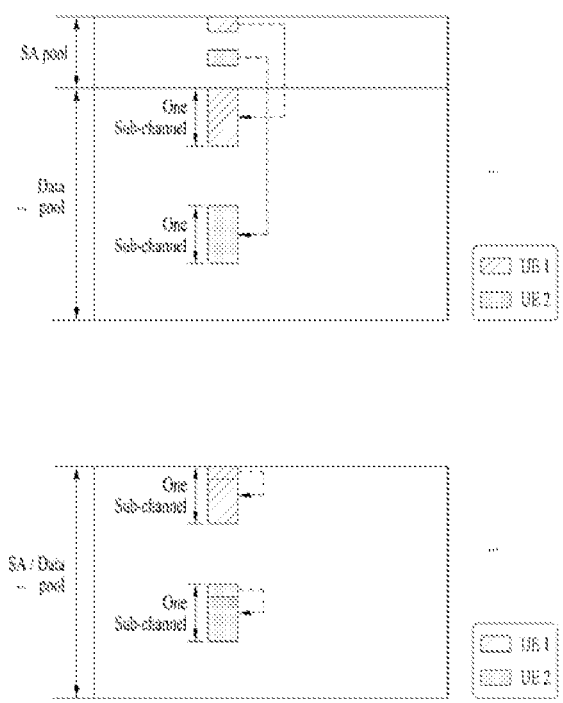
FIG. 12 is a diagram referred to for describing an SA and data transmission in V2X.

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other as illustrated in FIG. 12(*a*) or may be contiguous to each other as illustrated in FIG. 12(*b*). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
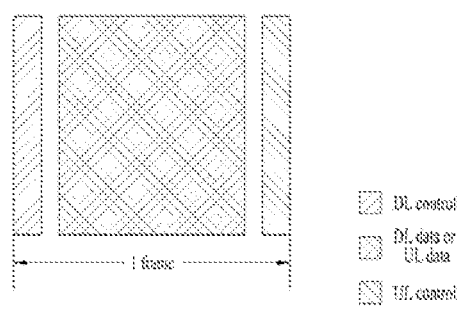
FIGS. 13 and 14 are diagrams illustrating a new radio access technology (NRAT) frame structure.
Figure 14:
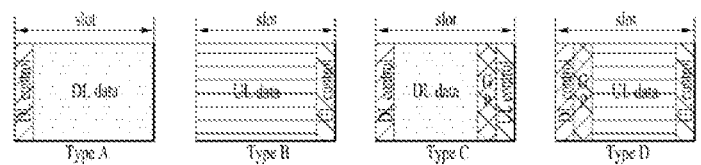

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like)

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP Rel. 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Distributed Antenna Units (DUs)

Figure 15:
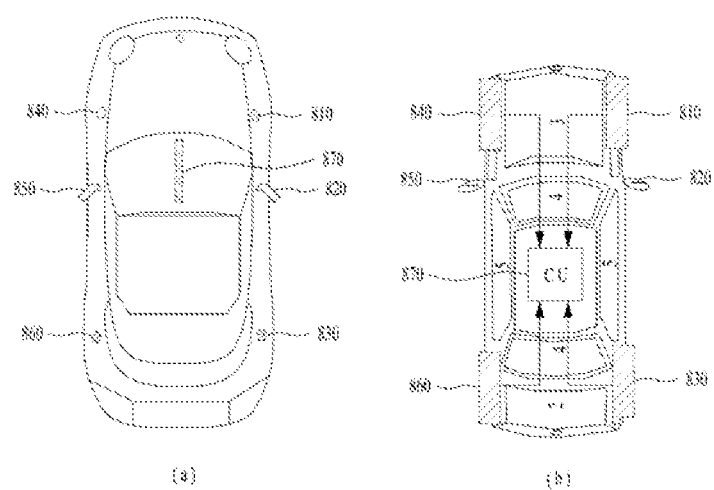
FIG. 15 is a diagram illustrating a vehicle equipped with distributed antenna panels according to an embodiment of the present disclosure.

FIG. 15 is a diagram illustrating a vehicle equipped with distributed antenna panels according to an embodiment of the present disclosure. The above-described wireless communication system is used more frequently in a wider range of services. Unlike the existing static services, there is a growing need to support high quality of service (QoS) along with a high data throughput or a high data rate to a UE or a user moving at a high speed.

However, the existing wireless communication systems may have limitations in providing services to a UE in consideration of fast movement or mobility. To support the services, a system network needs to be improved to the level of revolution. Further, it may be necessary to design a new system within a range that does not affect the existing network infrastructure, while maintaining compatibility with the existing network infrastructure.

For example, a plurality of antenna panels (beams, antenna ports, transceiver units (TXRUs), or antenna elements) may be installed in a vehicle related to a UE, so that a service may be supported for the UE during fast movement. In the vehicle, a central unit (CU) may collect data received at each of the plurality of antenna panels or information for channel state measurement from each of the plurality of antenna panels. For this operation, a MIMO system between vehicles may be considered. When a plurality of antenna panels (beams, antenna ports, TXRUs, or antenna elements) are used as described above, the vehicle may prevent the degradation of communication performance caused by a transmission loss having an average value of about 20 dB. In addition, the vehicle may be equipped with a plurality of antenna panels (beams, antenna ports, TXRUs, and or antenna elements) attached thereto, and achieve reception diversity by spacing Rx antennas from each other. That is, it may be possible to provide a service to a UE during fast movement through the above-described inter-vehicle MIMO system, without an additional design for a network.

However, despite the above-described advantages, it is difficult to apply an inter-vehicle MIMO system for such reasons as appearance of the vehicle and construction of a manufacturing system. Moreover, the vehicle is considerably expensive compared to the existing personal portable communication devices, and is not easily improved or updated. Further, since a vehicle is equipment that should satisfy more requirements such as design concept, aerodynamic structure, and so on as well as communication performance, vehicle designs may be limited for aesthetic/aerodynamic reasons. For example, some vehicle manufacturers use a combination antenna, which is inferior in performance to a single antenna, in order to eliminate visual discomfort brought by an existing antenna.

However, to overcome the spatial constraints of large-scale antenna arrays in an environment requiring the development of communication systems, the installation of a distributed antenna array system for implementing a multi-antenna array system in a vehicle has been introduced and applied in consideration of harmony with the exterior of the vehicle.

Referring to FIG. 15, for example, a vehicle may be equipped with a plurality of antenna panels 810, 820, 830, 840, 850, and 860. The positions and number of the antenna panels 810, 820, 830, 840, 850, and 860 may vary depending on a vehicle design system and each individual vehicle. The configuration described below may be applied irrespective of the positions and number of the antenna panels 810, 820, 830, 840, 850, and 860, and the present disclosure is not limited to the following embodiment. That is, the configuration is applicable to antennas deployed in various shapes and radiation patterns according to the positions of the antenna panels 810, 820, 830, 840, 850, and 860.

A CU 870 may control signals for the antenna panels distributed in the vehicle. That is, the CU 870 of the vehicle may control signals to the plurality of antenna panels 810, 820, 830, 840, 850, and 860 installed in the vehicle to receive signals from a BS or other UEs, while maximizing reception diversity, and may prevent wireless disconnection from the BS or UEs during high-speed movement. That is, the vehicle itself may serve as one UE or a relay UE that relays signals, which has a plurality of antenna panels. The vehicle may provide a quality service to a plurality of UEs in the vehicle through control and relaying of received signals through the CU 870.

When wireless communication (or sidelink communication) is conducted through the plurality of antenna panels 810, 820, 830, 840, 850, 860 as described above, channel state information (e.g., a received signal strength indicator (RSSI), a reference signal received quality (RSRQ), a channel busy ratio (CBR), or a channel occupancy ratio) measured in specific resources may be different for each antenna panel. Specifically, the sensing (or/and measurement) results of the antenna panels (beams, antenna ports, TXRUs, or antenna elements) may be different due to self-blocking of the body of the UE (or vehicle), reflection between UEs (or vehicles), the angles of surfaces on which the antenna panels (beams, antenna ports, TXRUs, or antenna elements) are mounted, different radiation patterns, beamforming gains, or antenna gains due to different positions, or formation of beam directionalities. For example, for a vehicle at a specific location, the presence or absence of vehicle blockage may be determined differently for each antenna panel (beam, antenna port, TXRU, or antenna element) at a different position.

An additional problem such as cable power loss, delay, or out of synchronization may occur to each antenna panel due to distributed arrangement of the antenna panels. Particularly, there is a need for considering different power requirements for the antenna panels in transmitting sidelink signals (or the same sidelink signal) due to this problem.

Now, a description will be given of a method of allocating transmission power to each individual antenna panel (beam, antenna port, TXRU, or antenna element) by independently calculating required power for each of a plurality of antenna panels and determining reference transmission power based on the required power calculated for the plurality of antenna panels.

Power Control for V2X in Consideration of Distributed Antennas

When a plurality of antenna panels (beams, antenna ports, TXRUs, or antenna elements) are used to secure (Tx/Rx) coverage of V2X communication, resource management methods (e.g., methods for sensing and resource selection, load control, antenna panel (beam, TXRU, antenna port, or antenna element) selection, and so on) are provided as the following proposals. Herein, a beam may include a beam for a baseband end (or digital beam) or a beam for a radio frequency (RF) end (or analog beam). A TXRU may be a unit including a phase shifter related to analog beam control and an amplifier. For example, some or all of different antenna panels (beams, antenna ports, TXRUs, or antenna elements) may be located in different places in a UE (e.g., vehicle). For example, the antenna panels (beams, antenna ports, TXRUs, or antenna elements) in the different places may differ in link quality (/channel state) and beamforming gain (/antenna gain) (or beam (bore sight) directionality). Alternatively, V2X communication modes may include (1) mode 3 in which a BS signals (or controls) scheduling information related to V2X message transmission (or reception) in a V2X resource pool preconfigured or signaled by the BS or network, and/or (2) mode 4 in which a UE autonomously determines or controls scheduling information related to V2X message transmission (or reception) in a V2X resource pool preconfigured or signaled by a BS or network. A UE located within the communication coverage of the BS and/or a UE in the RRC_CONNECTED state may be set to mode 3, whereas a UE located outside the communication coverage of the BS and/or a UE in the IDLE state may be set to mode 4. Mode 4 may also be set for a UE located within the communication coverage of the BS and/or a UE in the RRC_CONNECTED state.

For example, the term "sensing operation" may be interpreted as an operation of measuring PSSCH-RSRP based on a PSSCH-DMRS sequence scheduled by a successfully decoded PSCCH and/or an operation of measuring S-RSSI based on a V2X resource pool-related subchannel (see Table 2) in the present disclosure. The term "reception" may be interpreted (or extended) as at least one of (1) a V2X channel (or signal) decoding (or reception) operation and/or a WAN DL channel (or signal) decoding (or reception) operation, and/or (2) a sensing operation, and/or (3) a CBR measurement operation in the present disclosure. The V2X channel may include the PSCCH, the PSSCH, the PSBCH, and the PSSS/SSSS, and the WAN DL channel may include the PDCCH, the PDSCH, and the PSS/SSS.

In addition, the term "transmission" may be interpreted (or extended) as a V2X channel (or signal) transmission operation and/or a WAN UL channel (or signal) transmission operation in the present disclosure. The V2X channel may include the PSCCH, the PSSCH, the PSBCH, and the PSSS/SSSS, and the WAN DL channel may include the PUSCH, the PUCCH, and the SRS in the present disclosure. The term synchronization signal (SS) may be interpreted (or extended) as including "PSBCH" as well as "SLSS" in the present disclosure.

Table 1 describes an exemplary definition of a BWP and/or a carrier.

TABLE 1

- Definition of bandwidth part
    - ✓ A contiguous set of PRBs in a given numerology
- Motivation of bandwidth part
    - ✓ Energy saving by using RF switching
    - ✓ Load balancing among different bandwidth part
    - ✓ A single cell can support multiple UEs with different capability in terms of system bandwidth size
    - ✓ Forward compatibility for potential extension of system bandwidth sizes
- Bandwidth part in Rel-15
    - ✓ A UE can support only one active DL BWP at a time for DL carrier in a cell
    - ✓ A UE can support at most one active UL BWP in UL or UL and SUL or SUL only depending on SUL configuration
        - In case SUL is not configured, at most one in UL carrier corresponding to the DL carrier TABLE 1-continued

Figure 16:
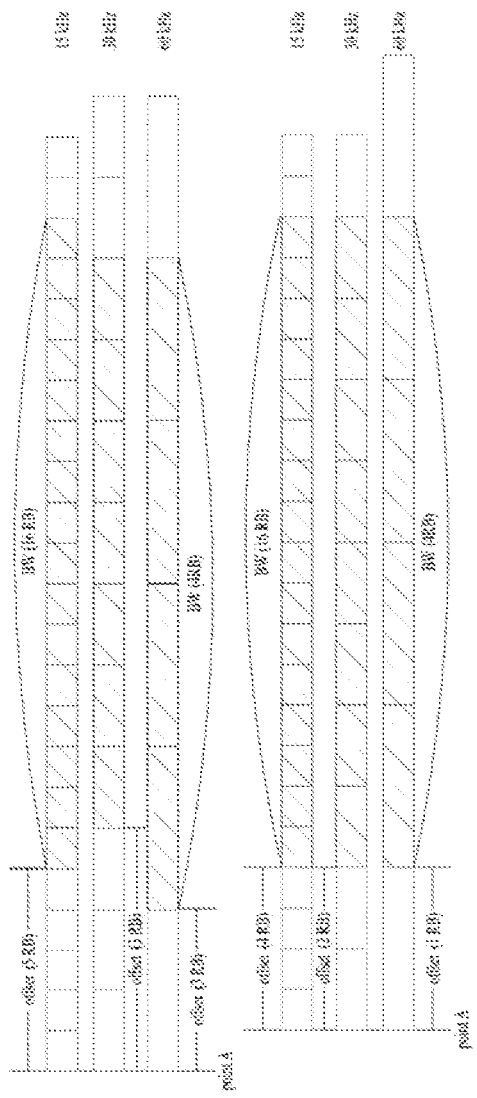
FIG. 16 is a diagram referred to for describing the definition of a carrier according to the present disclosure.
Figure 17:
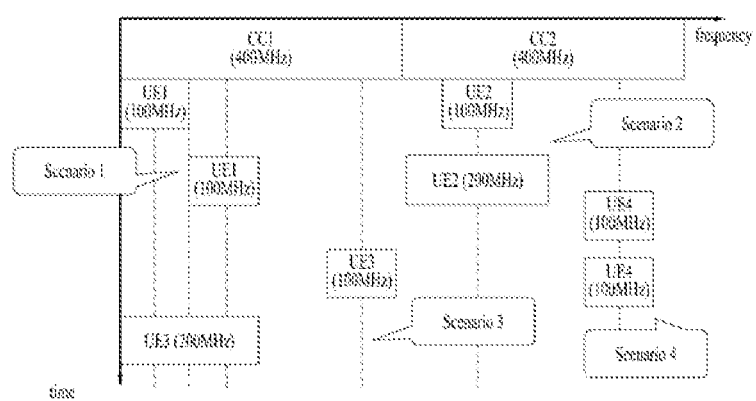

- In case SUL with dynamic switching is configured, at most one in each UL and SUL
- In case SUL is only used, at most one in SUL carrier
- ✓ A UE expects the same numerology between DL BWP and UL BWP at the same time in a given cell except for UL BWP in SUL carrier
  - SUL carrier can support different numerology from DL carrier in the cell
  - The numerology is however smaller or equal to that of DL carrier
- ✓ A UE is configured or accessed initial DL/UL BWP for each cell
  - Initial DL/UL BWP defines the first BWP that the UE access in a given cell
  - In PCell, initial DL/UL BWP is defined by SSB & RMSI configuration
  - In other cell, initial DL/UL BWP can be configured
- Definition of carrier (See FIG. 16)
  - ✓ Center frequency and bandwidth
  - ✓ Subcarrier spacing(s) supported by the carrier are also indicated for a given carrier
  - ✓ Parameters configured in each cell/carrier includes
    - Point A: Reference point outside of carrier's PRBs where subcarrier 0 of all numerologies (supported by the network in that carrier) are aligned
    - Offset between point A and lowest subcarrier for a given subcarrier spacing: the lowest frequency of PRBs of the given numerology (in RBs based on the given numerology)
    - Bandwidth in # of RBs: bandwidth of the given numerology PRBs
- Relationship between carrier and bandwidth part
  - ✓ Configurations done at carrier level
    - PRB grid of each numerology supported by the carrier
    - BWP configurations (up to 4) in that carrier (DL/UL separate)
    - CBG configuration
    - TPC (per cell group)
    - HARQ process
    - Scrambling/sequence related parameters
  - ✓ Configurations done at BWP level
    - Control resource set (configured per cell, but association per BWP)
    - Resource allocation related parameters (T/F) & DM-RS config
    - CSI-RS related parameters
    - SRS resource set
    - HARQ-ACK & SR resource
    - Configured UL grant
- BWP Switching latency (See FIGS. 17 and 18)
  - ✓ Type 4 UE-capability to indicate between Type1 and Type2 delay that the UE supports
  - ✓ Scenario 4 does not require 'RF component latency'
- Active Bandwidth part
  - ✓ UE is not required to monitor the downlink radio link quality in DL BWPs other than the active DL BWP on the primary cell
  - ✓ UE is not expected to receive PDCCH, PDSCH, or CSI-RS (except for RRM) outside an active DL BWP
  - ✓ UE is not expected to be triggered with a CSI report for a non-active DL BWP
  - ✓ UE is not expected to transmit PUCCH, or PUSCH outside an active UL BWP
  - ✓ For a given time, a single BWP is active per link (DL/UL/SUL) per cell
  - ✓ DCI format 1_1 and DCI format 0_1 can have bandwidth part indicator for dynamic change of DL/UL BWP for PDSCH/PUSCH transmission
    - For each DCI field, the bit field size is determined based on the active DL BWP where PDCCH is transmitted, and the interpretation is based on the BWP indicated by DCI format 1_1 or 0_1
- Initial Bandwidth part
  - ✓ For DL, initial BWP is given by consecutive RB sets for RMSI CORESET (which is configured by PBCH)
  - ✓ Subcarrier spacing,
  - ✓ CP length,
  - ✓ For UL, initial BWP is given by SIB for random access procedure
- Default Bandwidth part
  - ✓ Default DL bandwidth part is higher layer configured
  - ✓ Initial value of default bandwidth part is initial DL bandwidth part
  - ✓ For energy saving, UE will switch its active bandwidth part to default bandwidth part when UE does not detect DCI format 1_1 or DCI format 0_1 for a certain duration of time (based on BWP-InactivityTimer)

Table 2 describes an exemplary definition of S-RSRP and/or S_RSSI and/or CBR and/or CR.

TABLE 2

| 5.1.28 Sidelink Received Signal Strength Indicator (S-RSSI) | |
|---|---|
| Definition | Sidelink RSSI (S-RSSI) is defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe<br>The reference point for the S-RSSI shall be the antenna connector of the UE.<br>If receiver diversity is in use by the UE, the reported value shall not be lower than the corresponding S-RSSI of any of the individual diversity branches |
| Applicable for | RRC_IDLE intra-frequency,<br>RRC_IDLE inter-frequency,<br>RRC_CONNECTED intra-frequency,<br>RRC_CONNECTED inter-frequency |
| 5.1.29 PSSCH Reference Signal Received Power (PSSCH-RSRP) | |
| Definition | PSSCH Reference Signal Received Power (PSSCH-RSRP) is defined as the linear average over the power contributions (in [W]) of the resource elements that carry demodulation reference signals associated with PSSCH, within the PRBs indicated by the associated PSSCH.<br>The reference point for the PSSCH-RSRP shall be the antenna connector of the UE.<br>If receiver diversity is in use by the UE, the reported value shall not be lower than the corresponding PSSCH-RSRP of any of the individual diversity branches |
| Applicable for | RRC_IDLE intra-frequency,<br>RRC_IDLE inter-frequency,<br>RRC_CONNECTED intra-frequnecy,<br>RRC_CONNECTED inter-frequency |
| NOTE: The power per resource element is determined from the energy received during the useful part of the symbol, excluding the CP. | |
| 5.1.30 Channel busy ratio (CBR) | |
| Definition | Channel busy ratio (CBR) measured in subframe n is defined as follows:<br>    For PSSCH, the portion of sub-channels in the resource pool whose S-RSSI measured by the UE exceed a (pre-)configured threshold sensed over subframes [n − 100, n − 1];<br>    For PSCCH, in a pool (pre)configured such that PSCCH may be transmitted with its corresponding PSSCH in non-adjacent resource blocks, the portion of the resources of the PSSCH pool whose S-RSSI measured by the UE exceed a (pre-)configured threshold sensed over subframes [n − 100, n−], assuming that the PSCCH pool is composed of resources with a size of two consecutive PRB pairs in the frequency domain. |
| Applicable for | RRC_IDLE intra-frequency,<br>RRC_IDLE inter-frequency,<br>RRC_CONNECTED intra-frequency,<br>RRC_CONNECTED inter-frequency |
| NOTE: The subframe index is based on physical subframe index | |
| 5.1.31 Channel occupancy ratio (CR) | |
| Definition | Channel occupancy ratio (CR) evaluated at subframe n is defined as the total number of sub-channels used for its transmissions in subframes [n − a, n − 1] and granted in subframes [n, n + b] divided by the total number of configured sub-channels in the transmission pool over [n − a, n + b]. |
| Applicable for | RRC_IDLE intra-frequency,<br>RRC_IDLE inter-frequency,<br>RRC_CONNECTED intra-frequency,<br>RRC_CONNECTED inter-frequency |

NOTE 1:
a is a positive integer and b is 0 or a positive intger; a and b are determined by UE implementation with a + b + 1 = 1000, a >= 500, and n + b should not exceed the last transmission opportunity of the grant for the current transmission.
NOTE 2:
CR is evaluated for each (re)transmission.
NOTE 3:
In evaluating CR, the UE shall assume the transmission parameter used at subframe n is reused according to the existing grant(s) in subframes [n + 1, n + b] without packet dropping.
NOTE 4:
The subframe index is based on physical subframe index.
NOTE 5:
CR can be computed per priority level Table 3 below describes an exemplary beam failure recovery (BFR), radio link monitoring (RLM), and/or L3 measurement (or radio resource management (RRM)) procedure.

TABLE 3

Beam failure recovery
  Motivation
    Frequent radio link failure can be occurred in FR2 operation due to the
    analog beamforming based communication
      A serving beam pair is vulnerable to UE mobility, UE rotation, or
      beam blockage
      Radio link recovery takes too long time until the link is successfully
      recovered
    If UE can find a new beam based on periodic DL RS measurement,
    the link can be quickly recovered via changing the serving beam
    Define a new L1/L2 based fast link recovery procedure (UE-initiated
    serving beam change)
  Overall procedure
    Beam failure detection
      UE finds out whether serving DL beam is failed or not
    New beam identification
      UE finds out a new beam based on beam RS strength and selects
      an associated PRACH preamble
    BFRQ(beam failure recovery request) & monitoring response from gNB
      UE transmits the selected PRACH and searches for gNB's response
  Beam failure detection
    A beam failure instance
      When BLERs of all serving beams are above a threshold($Q_{out}$), it is
      called as a beam failure instance (BFI)
      For 'serving beam' RS determination,
        Option1: No explicit configuration of failure-detection-RS
          All of the CORESET beam RSs (CSI-RS or SS/PBCH
          block) are monitored
        Option2: Explicit configuration of failure-detection-RS
          The configured RS(s) are monitored
          Only periodic CSI-RS with single port is allowed to
          be configured
      PHY reports BFI to MAC sublayer periodically
        No BFI indication if the BLER is below the threshold ($Q_{out}$)
        The indication interval is determined by the shortest
        periodicity of failure-detection-RSs
        The interval is lower bounded by 2 msec
    'Bam failure' is declared if N BFIs are occurred, where consecutive BFIs
    should be occurred within a timer.
      If no BFI is received during M reporting intervals, MAC resets the
      BFI count.
      The value of N (max. BFD count) and M (BFD timer) are configured
      by RRC.
  New beam identification and PRACH Tx
    NW can configure a list of new candidate beam RSs and a list of
    associated contention-free (CF) PRACH resources to a UE by RRC
      Case1(1-1 mapping): a CF PRACH - an SSB ID
      Case2(1-1 mapping): a CF PRACH - a CSI-RS resource ID
      Case3(1-1 mapping): a CF PRACH - either an SSB ID or a CSI-RS
      resource ID
      Case4(1-X mapping): a CF PRACH - a SSB ID and sQCLed CSI-RS
      resource ID(s)
    When beam failure event is occurred, UE selects a beam RS (either SSB
    or CSI-RS) and transmits PRACH associated to the selected RS
      When the new beam RS list is configured, UE search for a new
      beam among the configured RSs first until a timer (Beam-failure-
      recovery-Timer) expires.
        If UE found at least one beam RS above a L1-RSRP
        threshold ($Q_{in}$),
          UE selects one of the RS(s) and transmits CF
          PRACH mapped to the selected one
        Else, UE search for all SSBs & selects one SSB among them,
        and then transmits contention-based PRACH associated
        to the selected SSB
          If at least one SSB is above a L1-RSRP threshold,
          UE selects one of the SSB(s)
          Else, UE selects any SSB
      After the timer expiration, UE search for a SSB and transmits
      contention-based PRACH associated to the SSB selected by UE
      When the new beam RS list is not configured, UE search for a SSB
      and transmits contention-based PRACH associated to the SSB
      selected by UE

TABLE 3-continued

If UE could not receive a response for the PRACH within a window, UE
can select another new beam and can transmit the PRACH associated to
the beam
UE stops the PRACH transmission if the number of PRACH transmissions
reaches to the maximum number (PreambleTransMax-BFR) configured by
RRC
PRACH response monitoring
  If gNB successfully detects the PRACH, it means that
    The UE is in 'beam failure' and a new beam is found by the UE
    The new beam ID or a set of potential new beam IDs is the one(s)
    associated to the PRACH
  gNB can transmit a PDCCH as a response to the PRACH for BFRQ
    For the response reception w.r.t. the CF PRACH,
      CRC of the PDCCH is scrambled by C-RNTI
      No restriction on the DCI format
      A dedicated search space for the response monitoring can
      be configured by RRC
      UE starts monitoring after 4 slots of the PRACH
      transmission
    For the response reception w.r.t. the CB PRACH, existing search
    space & related parameters for initial access is reused
    UE assumes that the PDCCH for BFRQ response is spatial QCL'ed
    with DL RS of the UE-selected new beam for the BFRQ
L3 Measurement for mobility management
  Measurement resources for RRM measurement
    LTE system
      Common Reference Signal is defined as "Always-On" signal
      CSI-RS within DMTC window (Small cell enhancement)
    NR system
      No "Always-On" reference signal
      Multi-beam operation
  Measurement Resource for RRM measurement in NR
    Measurement resource
      SS/PBCH block : SSS and PBCH-DMRS
      CSI-RS within active BWP (only in connected mode)
    SS/PBCH block based measurement is baseline
      SS/PBCH block : Always periodic transmission
      CSI-RS : No self-synchronization property
  SMTC (SSB-based RRM measurement Timing configuration)
    Similar to DMTC in LTE system
    Network power saving vs. UE complexity
      Long periodicity of SS/PBCH block for network power saving :
      maximum 160 ms
      High complexity of neighbour cell detection in UE from long
      periodicity
    UE power saving
      SS/PBCH blocks from neighbour cells are confined within the
      configured window
        Configured window = SMTC
        Comparable complexity of neighbour cell searcher to LTE
        system
      Measurement subset
        Network configuration of subset of SS/PBCH blocks
    Configuration
      SMTC window duration
      SMTC periodicity & timing offset
        Multiple SMTC (periodicity) configuration : SMTC1/SMTC2
        Common window duration and timing offset for SMTC1
        and SMT2
        Cell list in SMTC2 in case of multiple periodicity
        configuration
  CSI-RS resources
    Why CSI-RS resources?
      Large number of transmission beam in a cell
      Lighter resources than SS/PBCH block
      More flexible resource configuration
    Associated SS/PBCH block & QCL
      UE is required to measure all configured CSI-RS resources
        Large measurement capability & power consumption
      Associated SS/PBCH block for UE complexity reduction
        UE measurement : Only when the associated SS/PBCH
        block is detected
        QCL (Type-D) configuration with the associated SS/PBCH
        block resource
    Reference timing of CSI-RS Resource
      Associated SS/PBCH block : Timing of the detected cell
      No associated SS/PBCH block : Timing of the serving cell TABLE 3-continued Measurement report
  Per-cell measurement report
    If absThreshSS-BlocksConsolidation is not configured or the
    highest beam measurement quantity value is below absThreshSS-
    BlocksConsolidation
      Highest beam measurement quantity value
    else
      The linear average of the power values of the highest
      beam measurement quantity values above absThreshSS-
      BlocksConsolidation where the total number of averaged
      beams shall not exceed nrofSS-BlocksToAverage
  Per-beam measurement report
  Per-beam measurement report
    Detection of SSB index for per-beam measurement report
      High UE complexity for extraction of SSB index from PBCH
    Synchronization indicator (UseServingCellTimingForSync)
      Use timing of one cell to derive the SSB index of another cell
        Intra-frequency measurement: serving cell
        Inter-frequency measurement: any detected cell
      In TDD bands. Synchronization indicator is assumed to be set to
      TRUE
RSRP
  Used for Beam management and mobility (cell selection, reselection and
  handover)
  SS/PBCH block RSRP and CSI-RS RSRP
    SS-RSRP : linear average over the power contributions (in [W])
    from SSS and PBCH DM-RS in Idle, inactive, connected mode
    CSI-RS RSRP : linear average over the power contributions (in [W])
    from CSI-RS in connected mode
RSRQ
  Used for mobility (cell selection, reselection and handover)
  Secondary synchronization signal reference signal received quality (SS-
  RSRQ)

$$\frac{N \times SSB\_RSRP}{NR\ carrier\ RSSI},$$

where N is the number of RB's of the NR carrier RSSI
  measurement bandwidth.
  CSI reference signal received quality (CSI-RSRQ)

$$\frac{N \times CSI-RSRP}{CSI-RSSI},$$

where N is the number of resource blocks in the
  CSI-RSSI measurement bandwidth
RSSI
  Linear average of the total received power (in [W]) observed only in
  OFDM
  symbols of measurement time resource(s)
    Including co-channel serving and non-serving cells, adjacent
    channel interference, thermal noise etc.
  Measurement duration
    SS/PBCH block
      Default configuration
        SS/PBCH block : Any OFDM symbols within SMTC
        window (UE implementation)
      Network configuration
        Avoid UL part (and/or SS/PBCH block) for RSSI
        measurement in TDD band
        Measure over the indicated OFDM symbols of the
        indicated slots
    CSI-RS : OFDM symbol containing CSI-RS resources
  Rx beam for RSRQ measurement
    Same set of RX beams shall be used in measurement of each TX beam
    based on a measurement object
    Same Rx beam between RSRP measurement and RSSI measurement
Radio Link Monitoring for mobility management
  Overview
    Objective
      Detection of the downlink radio link failure (RLF) of the PCell and
      PSCell
      Periodic IS (In sync)/OOS (Out of sync) indication to RRC layer
      Radio link re-establishment after RLF
    Reference channel
      Same with LTE
      Hypothetical PDCCH (BLER)

TABLE 3-continued

```
Measurement resources
    SS/PBCH block and/or CSI-RS
        Explicit configuration from network
        Default RLM-RS : RSs indicated by TCI state of CORESETs
        for monitoring PDCCH
        Configurable Q_in/Q_out for service type (RAN4)
    Multiple beam operation in RLM
        Multiple RLM-RS configuration for multiple beam
        IS/OOS definition
            OOS : when the radio link quality is worse than the threshold Q_out
            for all resources in the set of resources for radio link monitoring
            IS : when the radio link quality is better than the threshold Q_in for
            any resource in the set of resources for radio link monitoring
        Beam failure and RLM
            Beam failure also use hypothetical PDCCH BLER
            Radio link monitoring : Potential cell-level link quality
                Concept: Monitoring all possible beams from gNodeB
                Maximum number of RLM-RS resources due to UE
                complexity
                    2 for below 3 GHz / 4 for 3~6 GHz / 8 for above
                    6 GHz
            Beam failure : Actual beam-level link quality
                Default resource : TCI-state of CORESET that UE is
                configured for monitoring PDCCH
```

The following description may be based on the assumption of a situation in which the same or different messages are transmitted through a plurality of antenna panels (beams, antenna ports, TXRUs, or antenna elements) (or a single antenna panel (beam, antenna port, TXRU, or antenna element)). For example, "simultaneous" transmission through a plurality of antenna panels (beams, antenna ports, TXRUs, or antenna elements) may help to alleviate the "half duplex" problem. Alternatively, some or all of different messages transmitted through a plurality of antenna panels (beams, antenna ports, TXRUs, or antenna elements) may be packets of the same service type (priority, prose per-packet priority (PPPP), or prose per-packet reliability (PPPR)) (or different services types (priorities, PPPPs, or PPPRs). Alternatively, a service with a relatively low PPPP value may be interpreted as a service with a relatively high priority, or a service with a higher PPPR value may be interpreted as a service of a higher priority (or a relatively high priority).

Alternatively, the messages may be broadcast packets (multicast packets, groupcast packets, or unicast packets (e.g., different packets may be transmitted simultaneously through a plurality of antenna panels (beams, antenna ports, TXRUs, or antenna elements)). For example, the broadcast packets may be the same packet transmitted simultaneously through the plurality of antenna panels (beams, antenna ports, TXRUs, or antenna elements), and the unicast packets may be different packets transmitted simultaneously through the plurality of antenna panels (beams, antenna ports, TXRUs, or antenna elements).

Alternatively, when different antenna port indexes are mapped to the plurality of antenna panels (beams, antenna ports, TXRUs, or antenna elements), the message transmission may be interpreted as a kind of multi-layer transmission. On the contrary, when the same antenna port index (or one antenna port index) is mapped to the MULTI-LAYER), the message transmission may be interpreted as a kind of single-layer transmission.

For the "same" physical resource, (some or all of) sensing (or/and measurement) results of the antenna panels (beam, antenna ports, TXRUs, or antenna elements) may be different, at least for reasons described below. Specifically, the sensing (or/and measurement) result may be different for each antenna panel (beam, antenna port, TXRU, or antenna element) due to self-blocking and/or reflection of the vehicle body, angles of surfaces on which the antenna panels (beams, antenna ports, TXRUs, or antenna elements) are mounted, or different radiation patterns (beamforming gains, antenna gains, or beam (bore sight) directionalities) in (some or all of) the antenna panels (beams, antenna ports, TXRUs, or antenna elements) at different locations. For example, for a vehicle at a specific location, the presence or absence of vehicle blockage may be determined differently for each antenna panel (beam, antenna port, TXRU, or antenna element) at a different location.

In the present disclosure, the wording "RSRP" may be extended "(sidelink or subchannel) RSSI" or "(sidelink or PSSCH) RSRQ" in its interpretation. For example, the wording "PSSCH" may be extended to "PSCCH" in its interpretation.

Message transmission (transmission of the same or different messages) through a plurality of antenna panels (beams, antenna ports, TXRUs, or antenna elements) (or a single antenna panel (beam, antenna port, TXRU, or antenna element) may be interpreted as packet transmission through a plurality of antenna ports (or one antenna port). When message(s) is transmitted through a plurality of antenna ports, the transmission power of a specific one of the antenna ports may be calculated as follows.

Specifically, (required) total transmission power P_TOTAL may be calculated in consideration of the size of transmission resources (in RBs), pathloss, open-loop power control (OLPC) parameters (e.g., ALPHA and P_O), and/or closed-loop power control irrespective of the number of antenna ports used for transmission. When the number of (configured) antenna ports related to a transmission scheme is N and the number of antenna ports used for actual transmission is M (e.g., M≤N), the transmission power of each of M antenna ports may be equally determined to be "P_TOTAL/M/N". In other words, the transmission power of a specific antenna port may not exceed "P_TOTAL/N", and equal power may always be allocated between the antenna ports involved in the actual transmission.

Alternatively, the required transmission power value may be different for each antenna panel (beam, antenna port, TXRU or antenna element), when the service type of conducted communication (the priority, PPPP, PPPR, or requirement (e.g., reliability or latency) of traffic) is different and/or when link quality (or channel state) or a beamforming gain (antenna gain or a beam (bore sight) directionality) is different. However, even though a different antenna port is mapped to each antenna panel (beam, antenna port, TXRU, or antenna element), different power may not be allocated to the antenna ports. Therefore, there is a need for an efficient power control method to alleviate the problem.

(Some of) the proposed methods of the present disclosure may be limited to a transmission operation (carrier/BWP selection) and/or a reception operation (carrier/BWP selection). For example, the term "BWP" may be interpreted as "resource pool". When a resource pool is configured in a BWP, the numerology of the resource pool such as a subcarrier spacing, a CP type, or a slot format is defined to (always) follow that of the BWP. Alternatively, a numerology independent of (or different from) that of the BWP may be configured for the resource pool.

When configuration information (e.g., a subcarrier spacing, a (frequency) position/size, and a slot format) for a BWP (IN-SL BWP) used for sidelink communication of an in-coverage UE is different from configuration information for a BWP (OUT-SL BWP) used for sidelink communication of an out-coverage UE, a gap is required for switching between the IN-SL BWP and the OUT-SL BWP and sidelink communication is discontinued during the gap. To solve this problem, the same configuration information may be configured for the IN-SL BWP and the OUT-SL BWP. The IN-SL BWP may be a BWP used for WAN (UL) communication for which a sidelink communication-related resource pool is configured.

When synchronization resources of a BWP used for sidelink communication, such as PSSS/SSS and PSBCH transmission/reception resources exist in another frequency area, not in the BWP, a gap (or time gap) may be required for synchronization detection (or time or frequency synchronization detection) in the synchronization resources, tracking, and/or link quality measurement with a synchronization source (e.g., quality measurement based on a PSBCH DMRS). The gap (or time gap) may be interpreted as a kind of measurement gap. It may be configured that resource selection/scheduling and/or message transmission/reception is not performed in the resources of the gap (or time gap) or a resource pool configuration-related bitmap is not applied to the resources of the gap (or time gap).

The term "configuration (definition or indication)" may be interpreted as "signaling (or preconfiguration) from a network". As described herein, "beam", "antenna panel", "antenna port, baseband-end antenna port (or digital beam antenna port), and RF-end antenna port (or analog beam antenna port)", "TXRU", and "antenna element" may be extended/interchangeable in their interpretation. Further, the terms "beam", "antenna panel", "antenna port", "TXRU", and "antenna element" may be extended respectively to "beam set", "antenna panel set", "antenna port set", "TXRU set", and "antenna element set" in their interpretation. In the present disclosure, the term "antenna panel" may be interpreted as a unit including one or more (or predetermined one or more) "beams", "antenna ports", "TXRUs", or "antenna elements".

Calculation of Reference Required Power Value (REF_POVAL)

A transmission power value required for each antenna panel (beam, antenna port, TXRU, or antenna element) may be calculated independently. For example, the antenna panel (beam, antenna port, TXRU, or antenna element) for which the required transmission power value is calculated may be considered to be an antenna panel (beam, antenna port, TXRU, or antenna element) to be used (or allocated) actually for transmission of a sidelink signal. In other words, when sidelink signals are transmitted through a plurality of antenna panels (beams, antenna ports, TXRUs, or antenna elements), a transmission power required for each of the antenna panels (beams, antenna ports, TXRUs, or antenna elements) is calculated independently. A "reference required power value REF_POVAL" may be determined based on the independently calculated transmission power of each antenna panel according to (some or all of) the following rules. When the UE simultaneously transmits sidelink signals through the plurality of antenna panels (beams, antenna ports, TXRUs, or antenna elements), the transmission power value of each antenna port (beam, antenna panel, TXRU, or antenna element) is calculated (or total required transmission power may be calculated in consideration of a transmission resource size), pathloss, an open-loop power control parameter, and/or closed-loop power control (e.g., the total required transmission power may be interpreted as P_TOTAL described above)). The transmission power value (or required power) for each antenna panel (beam, antenna port, TXRU, or antenna element) may be derived or calculated based on preconfigured OLPC parameters (e.g., ALPHA and P_0), a maximum transmission power value (or a maximum allowed transmission power value), CLPC, or a pathloss measurement RS. The OLPC parameter, the maximum transmission power value (or maximum allowed transmission power value), the CLPC, and the pathloss measurement RS may be the same or different for each antenna panel (beam, antenna port, TXRU, or antenna element).

Specifically, the reference required power value REF_POVAL may be calculated based on the transmission value (or required power value) for each antenna port (beam, antenna panel, TXRU, or antenna element) as follows. The maxim value (or minimum value) of the transmission power values (or required power values) for the antenna ports (beams, antenna panels, TXRUs, or antenna elements) may be configured as (or considered to be) the reference required power value REF_POVAL. Alternatively, the average (or weighted average) of the transmission power values (or required power values) for the antenna ports (beams, antenna panels, TXRUs, or antenna elements) may be configured as (or considered to be) the reference required power value REF_POVAL.

When the reference required power value REF_POVAL is calculated by weighted averaging, a weight may be applied to each antenna panel in consideration of the property of a sidelink signal related to a specific antenna panel, and the average value of the weighted required power values of the antenna panels may be determined to be the reference required power value REF_POVAL, as follows. A higher (relatively high) weight may be applied to an antenna panel (beam, antenna port, TXRU, or antenna element) through which a message related to a service with a relatively high priority (a message related to a service with a lower PPPP value or a higher PPPR value) is transmitted, an antenna panel (beam, antenna port, TXRU, or antenna element) through a predetermined specific channel (e.g., PSSS/SSSS or PSBCH) or a specific signal is transmitted, an antenna panel (beam, antenna port, TXRU, or antenna element) having a relatively high CBR (or CR), and/or an antenna panel (beam, antenna port, TXRU, or antenna element) having a relatively low CBR (or CR). A specific weight corresponding to a predetermined antenna panel (beam, antenna port, TXRU, or antenna element) may be preconfigured as the weight.

Alternatively, the transmission power value (or required power value) of an antenna panel (beam, antenna port, TXRU, or antenna element) through which a message related to a service with a relatively high (or highest) priority (or a message related to a service with a high PPPP value or a low PPPR value) may be determined (or configured) as the reference required power value REF_POVAL. Alternatively, the transmission power value (or required power value) of an antenna panel (beam, antenna port, TXRU, or antenna element) through which a message related to a service with a relatively lower (or lowest) priority (or a message related to a service with a low PPPP value or a high PPPR value) may be determined (or configured) as the reference required power value REF_POVAL. Alternatively, the transmission power value (or required power value) of a predetermined antenna panel (beam, antenna port, TXRU, or antenna element) may be determined (or configured) as the reference required power value REF_POVAL.

When there are a plurality of antenna panels corresponding to a specific priority (a message with the highest priority), one of the required power values of the plurality of antenna panels may be determined (or configured) as the reference required power value REF_POVAL. Specifically, when a message related to a service with the same priority (a message related to a service with the same PPPP or PPPR value) is transmitted through a plurality of antenna panels (beams, antenna ports, TXRUs, or antenna elements), the largest (or smallest) of the transmission power values (or required power values) of the plurality of antenna panels may be determined (or configured) as the reference required power value REF_POVAL.

When there are a plurality of antenna panels corresponding to a specific priority (a message with the highest priority), the average value (or weighted average value) of the required power values of the plurality of antenna panels may be determined (or configured) as the reference required power value REF_POVAL. Alternatively, a (required) transmission power value randomly selected from among the required power values of the plurality of antenna panels (beams, antenna ports, TXRUs, or antenna elements) (the (required) transmission power value of an antenna panel randomly selected from among the plurality of antenna panels (or an antenna panel with a predetermined or the lowest (or highest) index, an antenna panel through which a predefined specific channel/signal is transmitted, or an antenna panel with a relatively low (or high) CBR (or CR)) may be determined (or configured) as the reference required power value REF_POVAL.

A service (or PS service) requiring a relatively high reliability requirement and/or a relatively short delay requirement may be regarded as a service with a relatively high priority.

Alternatively, the (required) transmission power value of an antenna panel (beam, antenna port, TXRU, or antenna element) through which a message having a relatively large (or small) retransmission number is transmitted, an antenna panel (beam, antenna port, TXRU, or antenna element) through which a message is transmitted (or for which resources are scheduled) with a relatively long (or short) periodicity, or an antenna panel (beam, antenna port, TXRU, or antenna element) with a relatively low (or high) CBR (or CR) may be determined (or configured) as the reference required power value REF_POVAL.

Alternatively, the (required) transmission power value of an antenna panel (beam, antenna port, TXRU, or antenna element) through a predefined channel/signal is transmitted may be determined (or configured) as the reference required power value REF_POVAL. The predefined channel/signal may be configured as an SSB (i.e., SS/PBCH block) or a measurement RS.

In the present disclosure, once the reference required power value REF_POVAL is determined or calculated, power may be allocated on an antenna port basis (or on an antenna panel basis) in a process subsequent to the above-described calculation of the total transmission power P_TOTAL. For example, when the number of configured antenna ports (or antenna panels) related to a transmission scheme is N and the number of antenna ports (or antenna panels) actually used for transmission is M (e.g., M≤N), the transmission power of M antenna ports (or antenna panels) may be equally determined to be "REF_POVAL/M/N".

Reconfiguration of REF_POVAL

In the case where CBR measurement and/or congestion control (e.g., radio-layer parameter restriction/adjustment) is independently performed for each antenna panel (beam, antenna port, TXRU, or antenna element), when the determined reference required power value REF_POVAL exceeds a "maximum allowed power value" related to at least one antenna panel (beam, antenna port, TXRU, or antenna element), the reference required power value may be reconfigured as the minimum value (or weighted average value, average value, or maximum value) of the "maximum allowed power values" of the antenna panels (beams, antenna ports, TXRUs, or antenna elements).

The term "radio-layer parameter restriction/adjustment" may be interpreted as "maximum Tx power, (including zero Tx power), a range of retransmission numbers per TB, a range of PSSCH RB numbers, an MCS range, a maximum limit on occupancy ratio (CR_Limit), and so on. The radio-layer parameter restriction/adjustment may be configured differently (or independently) for each combination of a PPP value and a CBR value of a message (or a message to be transmitted).

According to an embodiment of the present disclosure, considering that when the transmission power value of each antenna port (TXRU, antenna element, beam, or antenna panel) is calculated based on the reference required power value REF_POVAL, the increment or decrement from an actual required power value ACT_POWER may be large, only W % of the actual required power value, ACT_POWER may be limited/set to a variation (i.e., ACT_POWER*(1-W/100)~ACT_POWER*(1+W/100)). When it is difficult to limit the actual required power value ACT_POWER within a variation related to at least one antenna port (TXRU, antenna element, beam, or antenna panel), the reference required power value REF_POVAL may be adjusted.

According to an embodiment of the present disclosure, when the differences between the independently calculated transmission power values (or required power values) of the antenna panels (beams, antenna ports, TXRUs, or antenna elements) are greater than a predetermined threshold, a message for a corresponding antenna panel (beam, antenna port, TXRU, or antenna element) and messages for the other antenna panels may be multiplexed in TDM, or the transmission of the message for the corresponding antenna panel may be omitted. A different threshold may be set according to a combination of the priorities (PPPPs or PPPRs) of services of messages to be transmitted through antenna panels (beams, antenna ports, TXRUs, or antenna elements). For example, as the differences between the priority (PPPP or PPPR) of a service for a specific antenna panel and those of the other antenna panels are greater, a lower threshold may be set for the specific antenna panel. Then, the message for the specific antenna panel (through which a message with a relatively high priority is transmitted) may be transmitted in TDM with a high probability. Alternatively, embodiments of determining (configuring or calculating) the above-described reference required power value REF_POVAL may be applied restrictively only when the difference between the transmission power values (or required power values) of the antenna panels (beams, antenna ports, TXRUs, or antenna elements) is less than the threshold.

According to an embodiment of the present disclosure, OLPC parameters (e.g., ALPHA and P_0) and/or a maximum transmission power value (or a maximum allowed transmission power value) may be configured independently for each service type (or priority, PPPP, PPPR, or numerology (e.g., subcarrier spacing or a slot format such as the number of symbols included in a slot)) or for each antenna panel (beam, antenna port, TXRU, or antenna element). CLPC may be performed independently for each service type (or priority, PPPP, PPPR, or numerology (e.g., subcarrier spacing or a slot format such as the number of symbols included in a slot)) or for each antenna panel (beam, antenna port, TXRU, or antenna element).

Further, without defining the reference required power value REF_POVAL (or regardless of the reference required power value REF_POVAL), only a "(maximum) allowed transmission power value difference" between antenna panels (beams, antenna ports, TXRUs, or antenna elements) may be configured as a requirement (or limitation), and the UE may autonomously allocate or determine a transmission power value for each antenna panel (beam, antenna port, TXRU, or antenna element) satisfying the above requirement.

According to an embodiment of the present disclosure, the UE may be implemented such that the "transmission power value differences" between the antenna panels (beams, antenna ports, TXRUs, or antenna elements) are within a predefined threshold (PC_CONDITION), while a predetermined "(maximum) power limit" for each antenna panel (beam, antenna port, TXRU, or antenna element) is satisfied. If the condition is not satisfied, signals may be transmitted in TDM through the antenna panels (beams, antenna ports, TXRUs, or antenna elements) or a signal transmission may be skipped. In the latter case, transmission of a message related to a service with a relatively low priority (or a message with a low PPPR value or a high PPPP value) may first be omitted until PC_CONDITION is satisfied. A power limit may be configured differently (or independently) according to a combination of a "measured CBR value" and a "PPPP value of a message to be transmitted" on an antenna panel (beam, antenna port, TXRU, or antenna element). This control method may be a kind of congestion control (e.g., radio-layer parameter restriction/adjustment).

A power headroom (PH) value may be calculated using the reference required power value REF_POVAL. For example, the PH value of a specific antenna panel (beam, antenna port, TXRU, or antenna element) may be determined based on the transmission power value (or required power value) of another antenna panel (beam, antenna port, TXRU, or antenna element) used for deriving the reference required power value REF_POVAL, or the PH value of the UE may be determined based on may be determined based on the transmission power value (or required power value) of the specific antenna panel (beam, antenna port, TXRU, or antenna element) used for deriving the reference required power value REF_POVAL. When the PH value is signaled (or reported), information about the antenna panel (beam, antenna port, TXRU, or antenna element) used for deriving the reference required power value REF_POVAL, and/or information about the reference required power value REF_POVAL, and/or (virtual) PH information about antenna panels which have not been used for deriving the reference required power value REF_POVAL may be additionally signaled (or reported).

The PH value calculation (or reporting) may be performed independently for each antenna panel (beam, antenna port, TXRU, or antenna element) and/or for each service type (priority, PPPP, or PPPR). When a PH value is signaled (or reported), information about a related antenna panel (beam, antenna port, TXRU, or antenna element) may also be signaled (or reported). When a PH value is calculated and signaled (or reported), the power limit (or maximum power limit) of an antenna panel (beam, antenna port, TXRU, or antenna element) may be considered. For example, when a specific antenna panel (beam, antenna port, TXRU, or antenna element) has not reached its power limit (or maximum power limit) and thus has a remaining available power value, the use of the remaining power value may affect another antenna panel (beam, antenna port, TXRU, or antenna element).

Because examples of the above-described proposed methods may also be included as one of the implementation methods of the present disclosure, it is obvious that they may be considered as a kind of proposed method. Further, while the above-described proposed methods may be implemented independently, some of the proposed methods may be combined (or merged). For example, the proposed methods have been described in the context of a 3GPP LTE system in the present disclosure, for the convenience of description. However, the range of systems to which the proposed methods are applied may be extended to other systems than the 3GPP LTE system. The proposed methods of the present disclosure may also be extended to D2D communication.

D2D communication refers to direct communication on a radio channel between UEs. For example, although a UE means a user terminal, network equipment such as a BS may also be regarded as a kind of UE, when it transmits/receives signals according to a D2D communication scheme. The proposed methods of the present disclosure may be restrictively applied only to a mode-3 V2X operation (and/or a mode-4 V2X operation). Further, the proposed methods of the present disclosure may be restrictively applied only to a preconfigured (or signaled) (specific) V2X channel (or signal) transmission (e.g., a PSSCH and/or an (associated) PSCCH and/or a PSBCH).

Further, the proposed methods of the present disclosure may be restrictively applied, only when a PSSCH and an (associated) PSCCH are transmitted adjacently (and/or non-adjacently) (in the frequency domain) (and/or when a transmission is performed based on a preconfigured (or signaled) MCS (and/or coding rate and/or RB) (value (or range)). Further, the proposed methods of the present disclosure may be restrictively applied only between mode-3 (and/or mode-4) V2X carriers (and/or (mode-4/mode-3) SL(/UL) SPSs (and/or SL(/UL) dynamic scheduling carriers)). Further, the proposed methods of the present disclosure may be restrictively applied, only when carriers are identical (and/or (partially) different) in terms of the positions and/or number of SS (transmission (and/or reception)) resources (and/or the positions and/or number of V2X resource pool-related subframes (and/or a subchannel size and/or the number of subchannels). Further, the proposed methods of the present disclosure may be extended to (V2X) communication between a BS and a UE. Further, the proposed methods of the present disclosure may be restrictively applied only to unicast (sidelink) communication (and/or multicast (or groupcast) (sidelink) communication and/or broadcast (sidelink) communication). For example, the proposed methods of the present disclosure may be restrictively applied only to a structure in which the transmission power of a specific antenna panel (beam, antenna port, TXRU, or antenna element) affects (determination of) the transmission power of another antenna panel (beam, antenna port, TXRU or antenna element) (e.g., a case in which the difference between the transmission power values of different antenna panels (beams, antenna ports, TXRUs, or antenna elements) may not be great to satisfy a "power error requirement" for each antenna panel (beam, antenna port, TXRU or antenna element)) and/or a structure in which the transmission power of a specific antenna panel (beam, antenna port, TXRU, or antenna element) does not affect (determination of) the transmission power of another antenna panel (beam, antenna port, TXRU or antenna element) (e.g., a case in which due to RF separation between different antenna panels (beams, antenna ports, TXRUs, or antenna elements), a transmission power difference does not matter).

Figure 19:
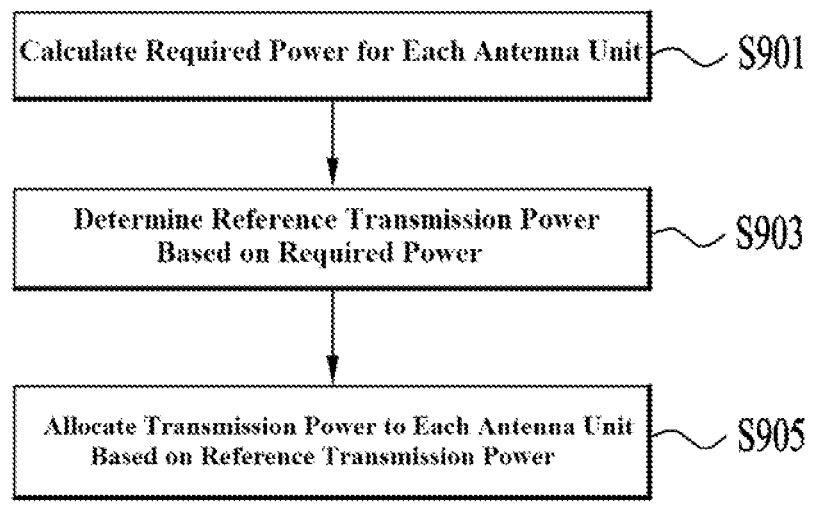
FIG. 19 is a flowchart illustrating a method of allocating power to antenna panels according to an embodiment of the present disclosure.

FIG. 19 is a flowchart illustrating a method of allocating power to antenna panels according to an embodiment of the present disclosure.

A UE or a vehicle including a UE may be equipped with a plurality of antenna units distributed to different positions (or a plurality of distributed antenna units) to physically diversify Tx and Rx directions. In this case, the UE may achieve Tx and Rx direction diversity by the physical distribution of the plurality of antenna units.

In this case, different CSI may be measured in specific resources, for each antenna unit. Specifically, the sensing (or/and measurement) results of the antenna panels (beams, antenna ports, TXRUs, or antenna elements) may be different due to self-blocking of the vehicle to which the UE is attached, reflection between vehicles, the angles of surfaces on which the antenna units are attached, different radiation patterns, beamforming gains, or antenna gains due to different positions, or formation of beam directionalities. For example, for a vehicle at a specific location, the presence or absence of vehicle blockage may be determined differently for each antenna unit at a different position. Then, a different measurement may be obtained for each antenna unit, and which measurement is to be selected for use in determining transmission parameters related to a sidelink signal at a UE may become an issue.

An additional problem such as cable power loss, delay, or out of synchronization may occur to each antenna panel due to distributed arrangement of the antenna panels. Particularly, different power values may be required for transmission of sidelink signals (or the same sidelink signal) through the antenna panels. However, since total transmission power is generally calculated in consideration of the size of transmission resources in RBs, pathloss, OLPC parameters, and/or CLPC irrespective of the number of antenna ports (or antenna units), transmission power may not be appropriately allocated to each antenna panel, without due consideration of actual required transmission power for each antenna unit.

A description will be given below of a method of allocating transmission power to each individual antenna panel (beam, antenna port, TXRU, or antenna element) by independently calculating required power for each of a plurality of antenna panels (beams, antenna ports, TXRUs, or antenna elements) and determining reference transmission power based on the required power calculated for the plurality of antenna panels.

Referring to FIG. 19, a UE may independently calculate required power for each of a plurality of antenna units through which a sidelink signal is transmitted (S901). The plurality of antenna units may be antenna units available for actual sidelink signal transmission.

The UE may then determine reference transmission power based on the calculated required power of each antenna unit (S903). Specifically, the UE may determine the required power value of any one of the antenna units based on the magnitude of the required power of each antenna unit, as the reference transmission power. For example, the UE may determine minimum or maximum required power as the reference transmission power.

Alternatively, the UE may select the required power of one of the antenna units in consideration of the priority (or reliability) of a sidelink signal (or service) related to each antenna unit and determine the selected required power as the reference transmission power. For example, the UE may determine the calculated required power of an antenna unit with a highest sidelink signal-related priority among the plurality of antenna units, as the reference transmission power. Alternatively, the UE may determine the calculated required power of an antenna unit with a lowest sidelink signal-related priority among the plurality of antenna units, as the reference transmission power.

Alternatively, the UE may determine the required power of any one of the antenna units as the reference transmission power based on a retransmission number corresponding to each antenna unit.

Alternatively, the UE may determine one of the average value of the required power or the weight average value of the required power obtained by applying predetermined weights, as the reference transmission power. The weights may be predetermined for the respective antenna units. Specifically, the weight of each antenna unit may be predetermined in consideration of a traffic priority related to a sidelink signal corresponding to the antenna unit. For example, a larger weight may be assigned to an antenna port through which a sidelink signal with a higher traffic priority.

Alternatively, when a CBR is measured independently for each antenna unit, the UE may determine the weight of the antenna unit based on a CBR value corresponding to the antenna unit. For example, a larger weight may be assigned to the required power of an antenna port with a higher CBR measurement. Alternatively, a larger weight may be assigned to the required power of an antenna port with a lower CBR measurement. Alternatively, the UE may configure a different weight according to a combination of a CBR measurement for each antenna unit and a related priority.

Subsequently, the UE may allocate transmission power to each antenna unit based on the determined reference transmission power (S905). If the difference between the required power exceeds a predetermined threshold, the UE may transmit a plurality of sidelink signals in TDM through the plurality of antenna units. A different threshold may be predetermined according to information related to the priority of a sidelink signal corresponding to each antenna unit. The predetermined threshold may be equal for the antenna units.

Alternatively, when power is allocated to each antenna unit based on the determined reference transmission power, the UE may allocate different power to each antenna port based on the required power of the antenna unit. For example, the UE may allocate relatively high transmission power to an antenna unit for which relatively high required power is calculated.

Alternatively, when the required power of each antenna unit exceeds a predetermined first threshold, the UE may transmit a plurality of sidelink signals in TDM through the plurality of antenna units. The first threshold may be predetermined in relation to the priority of a sidelink signal corresponding to each antenna unit. Further, the first threshold may be configured to be different for each antenna unit.

Alternatively, when power is allocated to each antenna unit based on the determined reference transmission power, the UE may allocate different power to each antenna port based on the required power of the antenna unit. For example, the UE may allocate relatively high transmission power to an antenna unit for which relatively high required power is calculated.

Alternatively, the UE may readjust the reference transmission power in the following case. Specifically, when CBR measurement and congestion control is performed independently on an antenna unit basis, maximum allowed transmission power may be configured independently for each of the plurality of antenna units. The maximum allowed transmission power may be configured based on a combination of the traffic priority of a sidelink signal corresponding to the antenna unit and the CBR measurement of the antenna unit. When the maximum allowed transmission power is configured in this manner, different maximum allowed transmission power may be configured for the plurality of antenna units. The reference transmission power may exceed the maximum allowed transmission power of at least one of the plurality of antenna units. In this case, the UE may readjust the reference transmission power. For example, when the reference transmission power exceeds the maximum allowed transmission power of each antenna unit, the reference transmission power may be adjusted to the smallest maximum allowed transmission power of the antenna units.

Alternatively, when a change ratio between the requested power and the allocated transmission power of each antenna unit exceeds a predetermined ratio, the UE may readjust the reference transmission power so that the change ratio is less than the predetermined ratio.

As described above, an antenna unit may correspond to or may be replaced with an antenna panel, an antenna port, a TXRU, or an antenna element. In addition, the antenna unit may correspond to or may be replaced with a beam (or beam direction) formed by at least one of an antenna panel, an antenna port, a TXRU, or an antenna element.

Communication System and Communication Device

Figure 20:
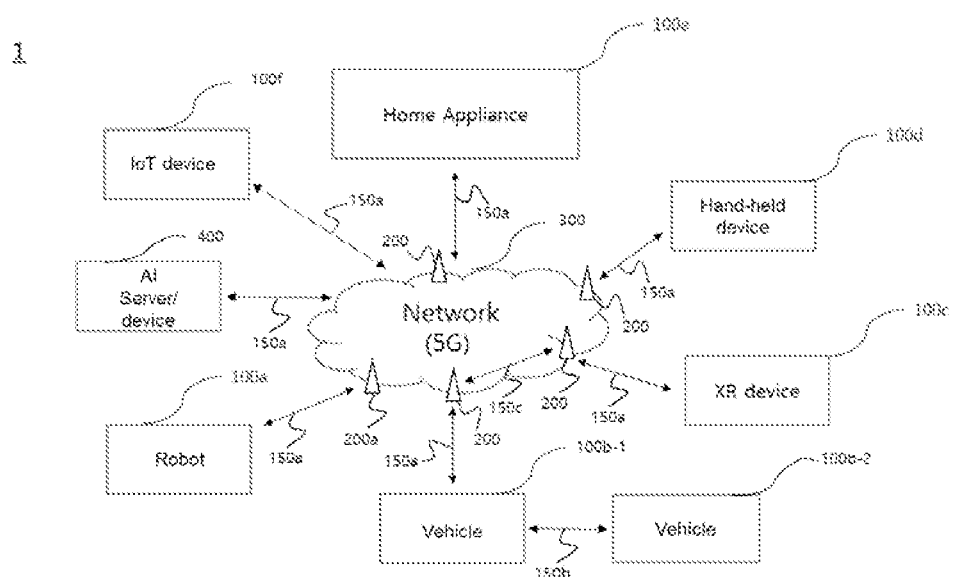
FIG. 20 illustrates a communication system applied to the present disclosure.

FIG. 20 illustrates a communication system applied to the present disclosure.

Referring to FIG. 20, a communication system 1 applied to the present disclosure includes wireless devices, BSs, and a network. Herein, the wireless devices represent devices performing communication using RAT (e.g., 5G New RAT (NR)) or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smart pad, a wearable device (e.g., a smart watch or smart glasses), and a computer (e.g., a notebook). The home appliance may include a TV, a refrigerator, and a washing machine. The IoT device may include a sensor and a smart meter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay or Integrated access backhaul (JAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

As described above, the BS 200 may classify WUS signals for each UE group or subgroup. The BS is a CDM scheme according to the above-described embodiments. The WUS signal may be classified for each UE group or subgroup by using at least one of the TDM method and the FDM method. As in the above-described embodiment, the BS may be configured to distinguish WUS resources for each WUS signal. The BS may transmit WUS configuration information for the WUS resource to the UEs, such as a higher layer signal. Thereafter, the BS may transmit a corresponding WUS signal within the WUS resource corresponding to the WUS configuration information.

Examples of Wireless Devices to which the Present Disclosure is Applied

Figure 21:
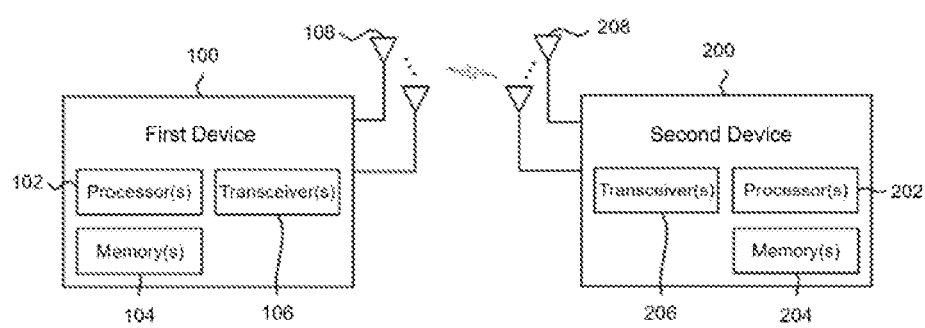
FIG. 21 illustrates wireless devices applicable to the present disclosure.

FIG. 21 illustrates wireless devices applicable to the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The processor 102 may calculate required power for transmission of a sidelink signal on an antenna unit basis based on a program stored in the memory 104. Further, the processor 102 may determine reference transmission power based on the calculated required power of the plurality of antenna units, and allocate transmission power to the antenna units based on the reference transmission power, based on the program stored in the memory 104. Further, the processor 102 may perform specific operations and calculate results in correspondence with the methods of determining or redetermining a reference transmission power based on the program stored in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters Example of Signal Processing Circuit to which the Present Disclosure is Applied FIG. 22 illustrates a signal processing circuit for a transmission signal.

Figure 22:
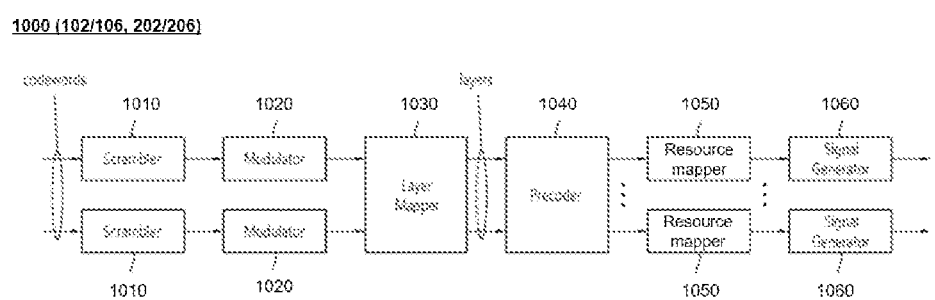
FIG. 22 illustrates a signal processing circuit for a transmission signal.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include inverse fast Fourier transform (IFFT) modules, cyclic prefix (CP) inserters, digital-to-analog converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, analog-to-digital converters (ADCs), CP remover, and fast Fourier transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Examples of Wireless Devices to which the Present Disclosure is Applied

Figure 23:
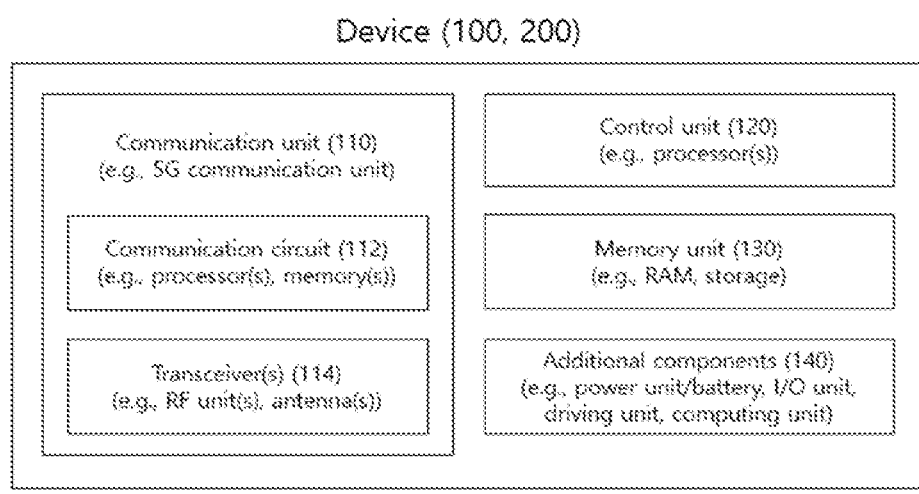
FIG. 23 illustrates another example of a wireless device applied to the present disclosure.

FIG. 23 illustrates another example of a wireless device applied to the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. W1), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a random access memory (RAM), a dynamic RAM (DRAM), a read only memory (ROM)), a flash memory, a volatile memory, a non-volatile memory, and/or a combination thereof.

Figure 24:
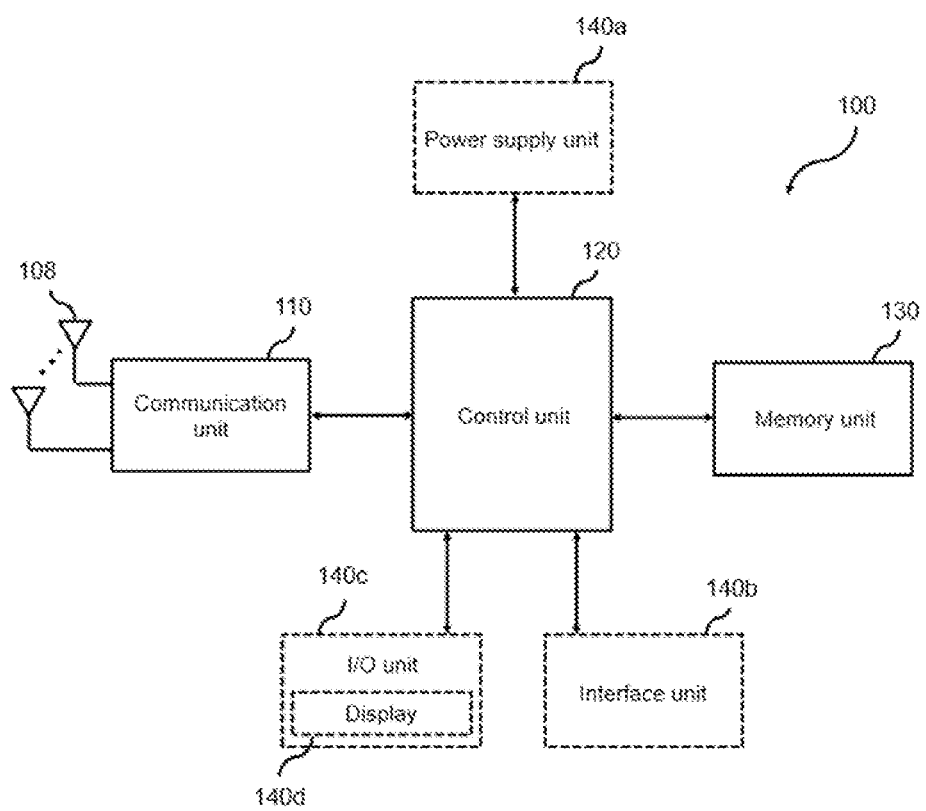
FIG. 24 illustrates a hand-held device applied to the present disclosure.

Hereinafter, an example of implementing FIG. 23 will be described in detail with reference to the drawings Examples of Mobile Devices to which the Present Disclosure is Applied FIG. 24 illustrates a hand-held device applied to the present disclosure. The hand-held device may include a smartphone, a smart pad, a wearable device (e.g., a smart watch or smart glasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 25:
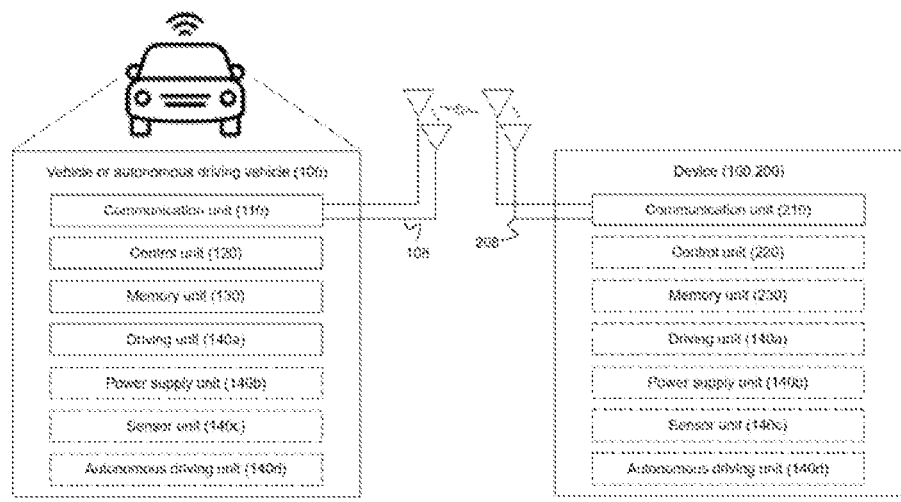
FIG. 25 illustrates a vehicle or an autonomous driving vehicle applied to the present disclosure.

Examples of Vehicles or Autonomous Vehicles to which the Present Disclosure is Applied FIG. 25 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 25, a vehicle or autonomous driving vehicle 100 may include an antenna unit 108, a communication unit 110, a control unit 120, a driving unit 140a, a power supply unit 140b, a sensor unit 140c, and an autonomous driving unit 140*d*. The antenna unit 108 may be configured as a part of the communication unit 110. The blocks 110/130/140*a* to 140*d* correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a BS. Such a transmission/reception relationship is extended in the same/similar manner to signal transmission/reception between a terminal and a relay or a BS and a relay. A specific operation described as being performed by a BS in this document may be performed by its upper node in some cases. That is, it is obvious that various operations performed for communication with a terminal in a network comprising a plurality of network nodes including a BS may be performed by the BS or network nodes other than the BS. The BS may be replaced by terms such as a fixed station, a Node B, an eNode B (eNB), an access point, and the like. In addition, the terminal may be replaced with terms such as UE, MS, and MSS.

In a hardware configuration, the embodiments of the present disclosure may be achieved by one or more ASICs, DSPs, DSPDs, PLDs, FPGAs, processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure are applicable to various mobile communication systems.

The invention claimed is:

1. A method of controlling transmission power of a sidelink signal by a user equipment (UE) in a wireless communication system supporting sidelink, the method comprising:
receiving configuration information for a resource pool for the sidelink signal;
selecting a first transmission resource for a Physical Sidelink Control Channel (PSCCH) in the resource pool;

selecting a second transmission resource for a Physical Sidelink Shared Channel (PSSCH) in the resource pool;

allocating a transmission power for the PSCCH including scheduling information for the second transmission resource for the PSSCH; and transmitting the PSCCH using a plurality of antenna units in the first transmission resource, wherein the UE measures a Channel Busy Ratio (CBR) related to the resource pool, wherein the UE performs congestion control on the PSCCH based on the measured CBR, wherein the UE calculates required power for each of the plurality of antenna units based on a power loss of each of the plurality of antenna units, and determines reference transmission power based on the required power of each of the plurality of antenna units, and wherein the UE allocates the transmission power to each of the plurality of antenna units based on the reference transmission power and the required power of each of the plurality of antenna units, and wherein, based on a change ratio between the required power of each of the plurality of antenna units and the transmission power for each antenna unit exceeding a predetermined ratio, the reference transmission power is adjusted to decrease the change ratio to or below the predetermined ratio.

2. The method according to claim 1, wherein the transmission power allocated to each of the plurality of antenna units is equal.

3. The method according to claim 1, wherein, based on a difference between the required power of each of the plurality of antenna units exceeding a predetermined threshold, the plurality of antenna units transmit a plurality of sidelink signals in time division.

4. The method according to claim 3, wherein the predetermined threshold is configured according to information related to a priority of a sidelink signal corresponding to each antenna unit.

5. The method according to claim 1, wherein the reference transmission power is determined to be an average of the required powers.

6. The method according to claim 5, wherein the average of the required powers is calculated by applying a weight to the required power of each antenna unit, and the weight is set on an antenna unit basis based on information related to a priority of a sidelink signal corresponding to each antenna unit.

7. The method according to claim 5, wherein the average of the required powers is calculated by applying a weight to the required power of each antenna unit, and a weight is set on an antenna unit basis based on the CBR) or a channel occupancy rate (CR) measured for each antenna unit.

8. The method according to claim 1, wherein the reference transmission power is determined to be the required power of one of the plurality of antenna units based on a retransmission number of a sidelink signal corresponding to each antenna unit.

9. The method according to claim 1, wherein the reference transmission power is determined to be the required power of one of the plurality of antenna units based on a priority and a reliability of traffic of a sidelink signal corresponding to each antenna unit.

10. The method according to claim 1, wherein the reference transmission power is determined to be the required power of one of the plurality of antenna units based on a magnitude of the required power calculated for each antenna unit.

11. The method according to claim 1, wherein, based on the CBR and the congestion control being performed for each of the plurality of antenna units, maximum transmission power is configured independently for each of the plurality of antenna units.

12. The method according to claim 11, wherein the maximum transmission power is configured based on a combination of a priority of traffic of a sidelink signal corresponding to each antenna unit and the CRB of the antenna unit.

13. The method according to claim 1, wherein the plurality of antenna units are physically distributed to achieve diversity of transmission and reception directions.

14. The method according to claim 1, wherein each of the plurality of antenna units corresponds to any one of an antenna panel, an antenna port, a transceiver unit (TXRU), and an antenna element.

15. An apparatus for controlling transmission power of a sidelink signal in a wireless communication system supporting sidelink, the apparatus comprising:

a transceiver; and a processor operatively coupled to the transceiver, wherein the processor is configured to control the transceiver to receive configuration information for a resource pool for the sidelink signal, select a first transmission resource for a Physical Sidelink Control Channel (PSCCH) in the resource pool, select a second transmission resource for a Physical Sidelink Shared Channel (PSSCH) in the resource pool, allocate a transmission power for the PSCCH including scheduling information for the second transmission resource for the PSSCH, and transmit the PSCCH using a plurality of antenna units in the first transmission resource, wherein the processor measures a Channel Busy Ratio (CBR) related to the resource pool, and performs congestion control on the PSCCH based on the measured CBR, wherein the processor calculates required power for each of the plurality of antenna units based on a power loss of each of the plurality of antenna units, and determines reference transmission power based on the required power of each of the plurality of antenna units, and wherein the processor allocates the transmission power to each of the plurality of antenna units based on the reference transmission power and the required power of each of the plurality of antenna units, and wherein, based on a change ratio between the required power of each of the plurality of antenna units and the transmission power for each antenna unit exceeding a predetermined ratio, the reference transmission power is adjusted to decrease the change ratio to or below the predetermined ratio.

* * * * *